(12) United States Patent
Irwin, Jr. et al.

(10) Patent No.: US 12,229,754 B2
(45) Date of Patent: Feb. 18, 2025

(54) SECURE FUNDING AND PAYOUT OF CRYPTOGRAPHIC CURRENCY FROM FIAT CURRENCY PURCHASES

(71) Applicant: IGT Global Solutions Corporation, Providence, RI (US)

(72) Inventors: Kenneth Irwin, Jr., Dawsonville, GA (US); Brian Keith Cash, Riverview, FL (US); Michael Louis Polito, Lakeland, FL (US)

(73) Assignee: IGT GLOBAL SOLUTIONS CORPORATION, Providence, RI (US)

( * ) Notice: Subject to any disclaimer, the term of this patent is extended or adjusted under 35 U.S.C. 154(b) by 0 days.

(21) Appl. No.: 18/164,106

(22) Filed: Feb. 3, 2023

(65) Prior Publication Data

US 2023/0186284 A1 Jun. 15, 2023

Related U.S. Application Data

(63) Continuation of application No. 17/662,487, filed on May 9, 2022, now Pat. No. 11,651,355.

(60) Provisional application No. 63/191,863, filed on May 21, 2021.

(51) Int. Cl.
  *G06Q 20/00* (2012.01)
  *G06Q 20/36* (2012.01)
  *G06Q 20/38* (2012.01)

(52) U.S. Cl.
  CPC ..... *G06Q 20/3678* (2013.01); *G06Q 20/3829* (2013.01); *G06Q 20/385* (2013.01)

(58) Field of Classification Search
  CPC ........... G06Q 20/3678; G06Q 20/3829; G06Q 20/385; G06Q 20/02; G06Q 20/367; G06Q 20/0655; G07F 17/3244
  USPC ............... 705/16, 21, 59; 380/44, 262, 278
  See application file for complete search history.

(56) References Cited

U.S. PATENT DOCUMENTS

| | | | |
|---|---|---|---|
| 8,135,644 | B2 | 3/2012 | Rowe |
| 8,408,986 | B2 | 4/2013 | Irwin et al. |
| 8,434,791 | B2 | 5/2013 | Irwin et al. |
| 8,523,657 | B2 | 9/2013 | Michaelson et al. |

(Continued)

FOREIGN PATENT DOCUMENTS

WO 2017184913 A1 10/2017

OTHER PUBLICATIONS

"Shannon's Demon and How Returns Can Be Created Out Of Thin Air", Richmond Quantitative Advisors, https://www.richmondquant.com/news/2021/9/21/shannons-demon-amp-how-portfolio-returns-can-be-created-out-of-thin-air, Sep. 29, 2021.

(Continued)

*Primary Examiner* — Dante Ravetti
(74) *Attorney, Agent, or Firm* — Neal, Gerber & Eisenberg LLP

(57) ABSTRACT

Systems and methods for enabling the secure use of cryptocurrencies (such as but not limited to Bitcoin, Ethereum, or Litecoin) in prize funds or gift cards that accept purchases or wagers in fiat currencies and payout in cryptocurrency. The prize funds can be associated with lotteries, charitable gaming, or casino environments with the inherent volatility of cryptocurrencies optionally mitigated and cryptocurrency payouts enabled for consumers or players without prior digital wallets as well as consumers or players with preexisting digital wallets.

16 Claims, 22 Drawing Sheets

(56) References Cited

U.S. PATENT DOCUMENTS

| | | |
|---|---|---|
| 9,666,023 B2 | 5/2017 | Irwin |
| 10,210,715 B2 | 2/2019 | Irwin et al. |
| 10,846,984 B2 | 11/2020 | Merati |
| 10,867,474 B2 | 12/2020 | Yi |
| 10,885,740 B2 | 1/2021 | Higgins et al. |
| 11,164,164 B2 | 11/2021 | Minor |
| 12,008,523 B2 * | 6/2024 | Ryann ................. G06Q 20/3276 |
| 2015/0209678 A1 | 7/2015 | Edwards et al. |
| 2015/0324764 A1 | 11/2015 | Van Rooyen et al. |
| 2016/0300222 A1 | 10/2016 | Yang |
| 2018/0043265 A1 | 2/2018 | Edwards et al. |
| 2018/0114405 A1 | 4/2018 | Millanta |
| 2018/0225656 A1 * | 8/2018 | Ray ..................... G06Q 20/3227 |
| 2019/0122495 A1 | 4/2019 | Yi |
| 2019/0355204 A1 | 11/2019 | Edgar et al. |
| 2019/0356641 A1 | 11/2019 | Isaacson et al. |
| 2020/0005293 A1 * | 1/2020 | Opeola ................. G06Q 20/065 |
| 2020/0082668 A1 | 3/2020 | Foley et al. |
| 2022/0067674 A1 | 3/2022 | Yan |
| 2023/0121749 A1 * | 4/2023 | Lee ....................... G06Q 20/065 |
| | | 713/171 |

OTHER PUBLICATIONS

Kelly, Jr., J. L., "A New Interpretation of Information Rate", The Bell System Technical Journal, Jul. 1956, 917-926.

Peterson, W. W., "The Portfolio Problem, and How to Pay the Forecaster, lecture notes taken at Massachusetts Institute of Technology", Spring, 1956, https://www.kuenzigbooks.com/pages/books/28622/c-e-shannon-w-w-peterson-claude-elwood/the-portfolio-problem-and-how-to-pay-the-forecaster-notes-taken-by-w-w-peterson-cover-several?soldItem=true.

Poundstone, William, "Fortune's Formula: the untold story of the scientific betting system that beat the casinos and Wall Street", Hill and Wang, A division of Farrar, Straus and Giroux, New York, 2005.

* cited by examiner

SECURE FUNDING AND PAYOUT OF CRYPTOGRAPHIC CURRENCY FROM FIAT CURRENCY PURCHASES

PRIORITY

This patent application is a continuation of, claims priority to and the benefit of U.S. patent application Ser. No. 17/662,487, filed on May 9, 2022, which claims priority to and the benefit of U.S. Provisional Patent Application No. 63/191,863, filed May 21, 2021, the entire contents of each of which are incorporated herein by reference.

BACKGROUND

The present disclosure relates to systems and methods for enabling the secure use of cryptocurrencies in prize funds or gift cards for funding and payout of awarded prizes as well as open loop gift cards.

In 1983, the American cryptographer David Chaum conceived of an anonymous form of cryptographic electronic money. Later, in 1995, David Chaum implemented his concept of cryptographic money as "Digicash", which required user software to withdraw a note from a bank and designate specific encrypted keys before the note could be sent to a recipient. In 1998, Wei Dai published a description of "b-money", characterized as an anonymous, distributed electronic cash system. The first decentralized cryptocurrency, "Bitcoin", was created and made public in 2009 by a presumably pseudonymous developer Satoshi Nakamoto. There have been many disputes regarding the actual inventor of Bitcoin. Bitcoin uses the SHA-256 ("Secure Hash Algorithm" with a "256" bit output) as its proof-of-work scheme.

By 2010, Bitcoin was widely mined (i.e., generating new Bitcoins by essentially solving a series of predefined mathematical problems), but not yet traded in an open market. Consequently, a Hungarian programmer (Laszlo Hanyecz, a.k.a. "Bitcoin Pizza Guy") bought two pizzas from Papa John's and reportedly traded 10,000 Bitcoins for the two pizzas as the first open market Bitcoin "trade". At a more recent Bitcoin exchange rate (i.e., $38,723.72 per 1 Bitcoin), the first Bitcoin trader paid approximately $387 million United States Dollars ("USDs") in exchange for the two pizzas.

As Bitcoin increased in popularity and the idea of decentralized and encrypted currencies became popular, the first alternative cryptocurrencies appeared. These alternative cryptocurrencies are sometimes known as "altcoin" and generally try to improve on the original Bitcoin structure by offering greater speed, greater anonymity, or another advantage. As of 2022, there are over 1,500 different cryptocurrencies in circulation, and additional cryptocurrencies regularly appear.

In 2013, shortly after the price of one Bitcoin exceeded $1,000 USD, the price of a Bitcoin in USDs dropped approximately 70% to around $300 USD per Bitcoin. However, in 2022, Bitcoin and other cryptocurrencies often trade for over $38,000 USD per crypto coin but are still subject to similar historical volatility. For example, FIGS. 1A and 1B provide graphs of the trading price of one Bitcoin 100 and one Ethereum 100' with the date of the trade plotted on the $\chi$-axes 102 and 102' and the exchange rate for one cyber coin in USDs plotted on the $\mathcal{Y}$-axes 101 and 101'. The volatility of Bitcoin and Ethereum in these examples is shown in FIGS. 1A and 1B. Other cryptocurrencies share similar levels of volatility. This volatility is often attributed to speculation, since the vast majority of cryptocurrency remain investment based with relatively few opportunities in 2022 to buy and sell physical goods in cryptocurrencies.

Most assets have some measure of volatility, but cryptocurrencies are, in 2022, one of the most volatile assets traded. As a result, accepting wagers in "fiat" currencies (i.e., government backed currencies such as but not limited to USDs, Euros, and Pound Sterling) and paying out prizes in cryptocurrencies (or vice versa) can run the risk of having the associated prize fund (i.e., the percentage of wagers accepted on a game that is anticipated to pay out awards according to a predetermined paytable or prize structure) value decrease or increase significantly at any moment independent of game play. Thus, there is an inherent problematic adverse volatility risk in using cryptocurrencies for gaming establishments and players for such games.

For example, assume a US state lottery advertises to pay out prizes in Bitcoins, but accepts $10 wagers in USDs. In this example, assume that the $10 wagers are accepted for a game where there will be 100 prizes presented from a future drawing with each prize awarding one Bitcoin each. Additionally, assume the prize fund adopts a current (i.e., at the time the wagers are made) Bitcoin price of $6,000 USD per Bitcoin. If the prize fund also anticipates a 70% Return To Player (RTP) with 100 Bitcoins promised as prizes for the entire game, then the prize fund anticipates that around 85,700 wagers will be made, thereby providing an approximate 70% RTP with the remaining 30% attributed to the operating costs and profit of the state lottery. However, in this example, also assume a day after most wagers are made some positive news about Bitcoin is announced, resulting in an increase in a Bitcoin's value to $8,000 USD per coin. Assuming the state lottery did not purchase the Bitcoin at the time of the wager, the prize fund would be short $200,000 USD in this example.

In addition to volatility impacting prize fund values, there have been many reported instances where cryptocurrency funds have been lost such as because those funds were stolen by nefarious hackers. This type of attack often happens when consumers store cryptocurrency in coin exchanges. Coin exchanges are often used to buy and sell different crypto coins or exchange fiat currencies into cryptocurrency assets. These types of security problems often arise when consumers use exchange provided digital "hot wallets" to store their cryptocurrency. In the past, many coin exchanges have not maintained the necessary digital safeguards to securely hold cryptocurrency. These so-called custodial services and best practices offered by banks for many years have been noticeably lacking with some cryptocurrency coin exchanges. This, in turn, has the undesirable side effect of inadvertently increasing the perceived risk of offering gaming in cryptocurrency, since most of the customers or players end up using the exchange provided digital wallets for long term cryptocurrency storage.

Alternatively, assuming a consumer or player does not elect to utilize exchange provided digital wallets and instead attempts to acquire and maintain their own personal digital wallet, the technical and security problems associated with creating and maintaining a digital wallet can be intimidating for most people. Part of the problem of creating and maintaining a digital wallet for most consumers or players is that the notion of storage is an abstract concept with cryptocurrencies because cryptocurrencies are technically not "stored" anywhere. Rather, cryptocurrency digital wallets actually contain one or more "private" asymmetrical cryptographic keys that only enable consumers to digitally sign transactions. The digital wallet's private keys are the cryptographical proof that the consumer owns a certain amount of cryptocurrency and not the cryptocurrency itself. In other words, anyone who knows someone's private key(s) can spend or transfer their cryptocurrency with impunity. With exchanges that simplify cryptocurrency ownership by providing a consumer with exchange maintained digital wallets, the private asymmetrical cryptographic keys are held by the exchange rather than the consumer, therefore placing the security of the cryptocurrency exclusively within the domain of the exchange. This has the adverse security effect of making the exchange itself a highly desirable target for nefarious computer hackers, since large quantities of cryptocurrencies may become available with a single successful security breach. Conversely, when consumers or players elect to create and maintain their own digital wallets, the digital wallets become a much smaller and more obscure target for nefarious computer hackers. However, if consumers or players setup and maintain their own digital wallets, the process is often technically daunting (e.g., create a "hot" or "cold wallet", create a "deterministic" or "non-deterministic" wallet, etc.) and consequently many people elect to simply not participate. Additionally, when the consumer or player sets up and maintains their own digital wallet they essentially become responsible for the security of the digital wallet with the unfortunate potential result that for an inexperienced user the security of their private digital wallet may become substantially less than the equivalent exchange based wallet.

Thus, offering a cryptocurrency based prize fund for most forms of gaming has been restrictive and undesirable for both the consumer or player and the gaming establishment. While there are multiple Internet based virtual casinos that do accept and pay out in cryptocurrencies, they often have the disadvantage of requiring the consumer or player to already have a cryptocurrency wallet and to avoid volatility associated impact to their prize funds, the Internet casinos often first convert cryptocurrency such that the wagers are in "fiat" currencies prior to game play. When the consumer or player elects to cash out, their winnings are converted back to cryptocurrency when cashing out thereby passing any volatility risk onto the consumer or player. While some Internet casinos are beginning to offer consumers or players the opportunity to wager directly in cryptocurrencies, to date no standard has emerged—most probably due to the problems highlighted above. Additionally, lottery agencies are continually searching for methods or attracting new groups of consumers or players and cryptocurrency owners may be a demographic that can be attracted to lottery products.

It is therefore desirable to develop techniques and methodologies for accommodating prize funds or gift cards payable with alternative cryptocurrencies at least in part as well as associated payout methods. Ideally, these techniques and methodologies would also provide cryptocurrency payouts or gift card funding in a format where the consumer or player is not needlessly burdened with wallet management.

BRIEF SUMMARY

In various embodiments, the present disclosure relates to a method of producing a payable on demand document that can be purchased with fiat currency and that is payable in cryptocurrency. The method includes: generating the payable on demand document with an unique redemption code and recording the redemption code in a first database; generating a digital wallet with asymmetrical cryptographic public and private keys; storing the digital wallet in a second database; creating a link to the digital wallet stored in the second database; assigning the link to the redemption code; storing the link in the first database; and funding the digital wallet with a specified amount of cryptocurrency after the redemption code is received at a central site and validated.

In various other embodiments, the present disclosure relates to a method of producing a payable on demand document that can be purchased with fiat currency and that is payable in cryptocurrency. The method includes: generating the payable on demand document with an unique redemption code; recording the redemption code in a database; creating a link of asymmetrical cryptographic keys of an existing digital wallet to the redemption code; storing that link in the database; and funding the digital wallet with a specified amount of cryptocurrency after the redemption code is received at a central site and validated.

In various other embodiments, the present disclosure relates to a method of automatically transferring cryptocurrency into a first digital wallet associated with a payable on demand document with a redemption code from a second digital wallet stored at a central site. The method includes: maintaining the second digital wallet with cryptocurrency referencing an external blockchain ledger; generating an asymmetrical cryptographic public and private key pair comprising the first digital wallet; storing the generated public and private key pair in a first database; creating a link to the first digital wallet; storing the link in a second database associated with the redemption code of the payable on demand document; and transferring an amount of cryptocurrency from the second digital wallet to the first digital wallet by registering a transfer on the external blockchain ledger after the redemption code is received and validated at the central site.

Objects and advantages of the invention will be set forth in part in the following description, or may be apparent from the present description, or may be learned through practice of the invention.

BRIEF DESCRIPTION OF SEVERAL VIEWS OF THE DRAWINGS

FIG. 2I is a representative example high level hardware architecture diagram of the key components associated with the system representative block diagram of FIG. 2H.

DETAILED DESCRIPTION

Figure 1A:
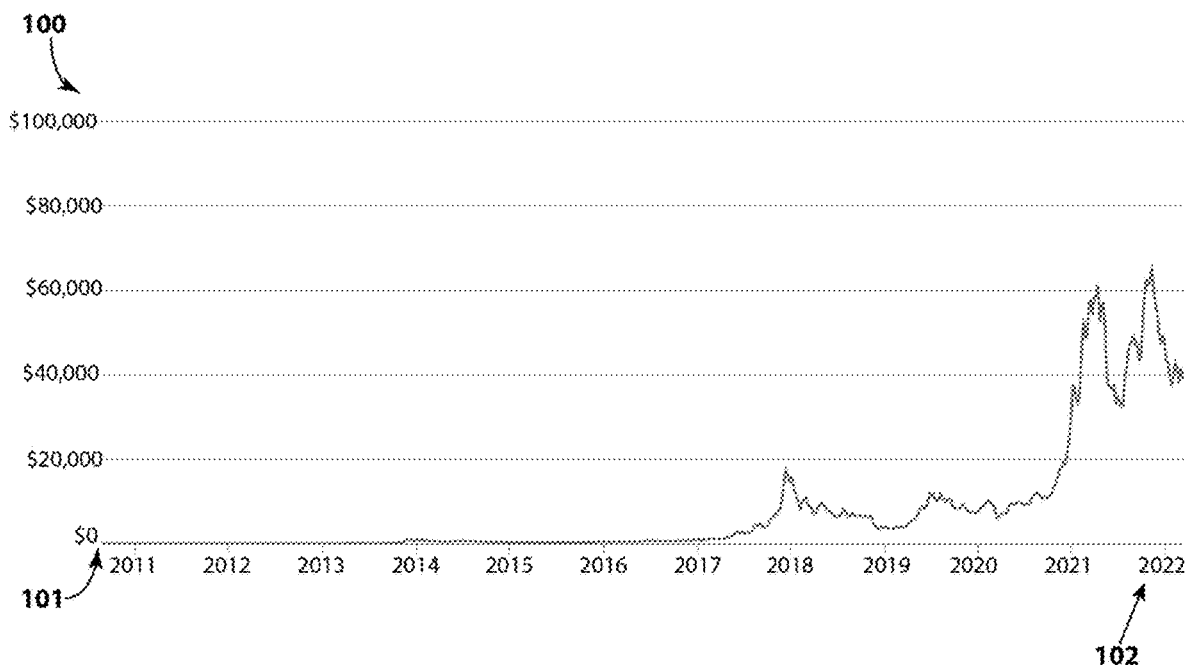
FIG. 1A is a first exemplary view of a prior art graph of the price of a first cryptocurrency (Bitcoin) from its introduction to 2022, highlighting the large amount of volatility in its pricing.

The present disclosure relates to a system and method for enabling the secure use of cryptocurrencies (such as but not limited to Bitcoin, Ethereum, or Litecoin) in prize funds or gift cards for funding and payout of awarded prizes as well as open loop gift cards. In varying embodiments, these prize funds are associated with lottery games (such as but not limited to instant ticket lottery games and draw lottery games), charitable gaming (such as but not limited to raffles and pull-tabs), or casino environments (such as but not limited to Class II or Class III gaming machines and gaming tables). Various embodiments of the present disclosure mitigate exchange rate fluctuations typical of cryptocurrencies while also enabling security countermeasures, thereby protecting the prize fund or open loop gift card funding wallet from devaluation or inflation as well as from malicious users. Various embodiments of the present disclosure additionally enable paying out prizes or funding gift cards in cryptocurrencies to or for consumers who may not have an existing digital wallet.

The present disclosure describes various cryptocurrency prize award and gift card mechanisms and methodologies for reliably and securely distributing cryptocurrency to consumers or players. Although the examples provided herein are primarily related to gaming or gift cards, it should be appreciated that the same or similar mechanisms and methods are applicable to other types of cryptocurrency payouts such as but not limited to retail transactions that accept fiat currency and payout in cryptocurrency.

Certain terminology is used herein for convenience only and is not to be taken as a limitation on the present disclosure. The term "fiat" currency denotes government-issued currency that is not backed by a physical commodity, such as gold or silver, but rather by the government that issued it (e.g., United States Dollar or "USD", the Euro, the British Pound Sterling). In the context of this disclosure, the term "fiat" currency is principally used to describe a common currency that can be used to buy or sell cryptographic currency at different denominations depending on the exchange rate. Additionally, the terms "player" or "consumer" are also used interchangeably all referring to a human individual.

The terms "digital wallet," "cryptocurrency wallet," "Winning Wallet," "winning digital wallet", "Gift Card Wallet", or "GCW" are used interchangeably herein to denote a storage medium that minimally contains at least a pair of public and private asymmetrical cryptographic keys that identify a static specific amount of cryptocurrency in a blockchain ledger. These cryptographic keys can be used to track ownership, receive, or spend cryptocurrencies. The public (shared) key(s) enables other digital wallets to make payments to the digital wallet's address, whereas the private (secret) key(s) enables the spending of cryptocurrency from the same digital wallet address (i.e., the digital wallet's private keys are the cryptographical proof that the consumer or player owns a certain amount of cryptocurrency, but does not "store" the cryptocurrency itself). Thus, the cryptocurrency is not physically "stored" in the cryptocurrency wallet. As mentioned above, with cryptocurrency the notion of storage is an abstract concept, and cryptocurrencies are technically not "stored" anywhere, but rather the cryptocurrency is maintained in decentral publicly available distributed ledgers called blockchains that can be accessed or edited by private key(s).

In regard to this disclosure, there are principally two different types of digital wallets including "hot and "cold" digital wallets. By definition, hot wallets are always online and therefor capable of directly connecting to the Internet. In contrast, cold wallets are offline, with no direct connection to the Internet. Since hot digital wallet are always connected to the Internet, they are often more susceptible and vulnerable to cyberattacks from hacking and consequently usually deemed less secure. In contrast, cold digital wallets are usually deemed more secure since no Internet connection is maintained to the cold wallet, but the onerous falls to the user to keep and protect the cold digital wallet. Both hot and cold digital wallets can be either "deterministic" or "non-deterministic." With a deterministic digital wallet, a single cryptographic key can be used to generate an entire tree of key pairs. Often a deterministic digital wallet utilizes a mnemonic sentence or word seed (i.e., more ergonomic method of expressing the key used as the root), as it can be algorithmically converted into the root private key(s). In a non-deterministic wallet, each key is randomly generated on its own accord, therefore no seeding is conducted from any common key or seed.

The term "prize fund" denotes the percentage of wagers accepted on a specific game that is anticipated to be paid out in prizes. The term "anticipated" in this context is noteworthy, since in some gaming formats the actual percentage of payout can differ from the anticipated percentage or Estimated Value ("EV") theoretically calculated. However, with some gaming formats, the anticipated prize fund percentage or EV pays out exactly as anticipated (such as for instant lottery tickets and parimutuel games). The actual funds paid to the winning players at the conclusion of a game are represented as "Return-To-Player" or "RTP."

The term "ticket" denotes a mechanism to hold a specific wager in escrow until it is known if the wager associated with that ticket is a winner or not and if the "ticket" is determined to be a winner function as a payable on demand document for transferring the winnings. Alternatively, a "ticket" can also be a payable on demand document embodying winnings from previous game play. In this context, a "ticket" can exist as a physical object (e.g., lottery instant ticket, draw game ticket, or "Tito" or "Ticket-In-Ticket-Out" ticket) or as a virtual object (e.g., internal gaming machine "ticket" holding player's wager in memory until the next "pull", or an Internet lottery site draw game wager).

The term "payable on demand document" denotes a document generated in accordance with the present disclosure that can be used to retrieve cryptocurrency by its holder on demand. This payable on demand document can be embodied as a physical object (such as but not limited to a substrate with indicia printed on a substrate) or as a virtual object (such as but not limited to data embedded in a digital document). The payable on demand document can be a scratch-off lottery ticket, a draw game ticket, a Tito ticket, a chip embedded in a card, a custom application, or a gift card depending on the embodiment employed as described in this disclosure.

The term "redemption code" denotes digital validation data that is electronically submitted to the central site to enable redemption of a specific amount of cryptocurrency. A "redemption code" can be embodied as a barcode, human readable charters or digits, or digital data stored electronically. Thus, a "redemption code" can be a validation code for a lottery instant ticket, a serial number for a draw game or Tito ticket, or an activation code for a gift card.

The term consumer "device" denotes a digital device (such as but not limited to a smart phone, a tablet, or a personal computer) usable by a consumer or player that is running or can run an application referenced or described in the present disclosure. The consumer device running the application communicates with the central site and can be utilized to scan or enter redemption codes printed on payable on demand documents and transmit the scanned or entered redemption codes to the central site for validation. Optionally, the consumer device can include a digital wallet's public key as well as in certain embodiments also the associated digital wallet's private key. Alternatively, the consumer device can employ an Internet web page connected to the central site to provide the same functionality.

The present disclosure contemplates the use of the "Shannon's Demon" and the "Kelly criterion" concepts or adaptations thereof for various embodiments of the system and method of the present disclosure. It is therefore useful to first provide a brief description of the concepts of Shannon's Demon and the Kelly criterion.

Shannon's Demon was conceived of by Claude Shannon of Bell Labs and the Massachusetts Institute of Technology (a.k.a., "MIT"). The present disclosure contemplates that Shannon's investing arbitrage methodology commonly known as Shannon's Demon can be employed for managing the inherent volatility of cryptocurrencies for prize funds in accordance with various embodiments of the present disclosure. Shannon's Demon was an experiment that proved that it is possible to make profits from an asset even if that asset doesn't have a positive expected return. In Shannon's initial lectures on Shannon's Demon at MIT, Shannon used a hypothetical stock with a "random walk" behavior. The hypothetical stock had a 50% chance of doubling its price and a 50% chance of halving its price every day. The Shannon's Demon investment scheme was to: invest 50% in the asset and the remaining 50% in cash and rebalance periodically. For example, assume you have two accounts one with $5,000 in cash and one with $5,000 value in stock. After the first day assume the stock trades 50% less than the day before. You now have $5,000 in cash and $2,500 in stock value (i.e., a $7,500 portfolio). Shannon's Demon would then stipulate that you rebalance the two accounts to 50%/50% with $3,750 in the cash account and $3,750 value in stock. Now assume the next day the stock's value increases to $7,500. Shannon's Demon would stipulate you rebalance again resulting in a value of $5,625 in each account (i.e., a total portfolio value of $11,250). Finally, on the third day the stock drops back to its original value of $5,000. A buy-and-hold investor would have no profit at all. An investor utilizing Shannon's Demon would make a profit of $625.

Thus, Shannon's Demon teaches making money on the fluctuations of the asset's price (often called volatility harvesting) instead of through the appreciation of the asset. The rebalanced portfolio is also much less volatile than a buy-and-hold investment scheme for the same asset. The present disclosure contemplates that for certain cybercurrency that has minimal transaction fees such as when cryptocurrency is used in a prize fund or a gift card as a payout mechanism (as described herein) where any minimal transaction fees can be accounted for as an operating cost, that employing Shannon's Demon or an adaptation thereof can be used to maintain a prize fund or gift card balance in which wagers or purchases are accepted in fiat currency and paid out in cryptocurrency.

The present disclosure contemplates that employing Shannon's Demon or an adaptation thereof can provide a rebalanced portfolio (i.e., cybercurrency and fiat currency) that will inherently be less volatile than the cybercurrency by itself and with minimal or no exchange costs. The reason employing Shannon's Demon or an adaptation thereof can achieve these results is it is based on a mathematical principle that the arithmetic mean return will always be greater than the geometric mean. Therefore, the present disclosure contemplates that a theoretical cryptocurrency with zero geometric mean return (such as truly random pricing) must have a positive arithmetic mean return.

The Kelly criterion was conceived of by John Kelly Jr. also of Bell Labs. The Kelly criterion model differs from Shannon's Demon in that while Shannon's Demon is configured to ensure returns with completely or mostly random fluctuations, the Kelly criterion model weighs information about the projected outcome to direct wagering or investing. In Kelly's paper "A New Interpretation of Information Rate" (J. L. Kelly Jr., Copyright © 1956 The Bell System Technical Journal), Kelly presented his idea as a system for betting on fixed horse races. Kelly provided that an example of a "gambler with a private wire" who gets advance word of the outcomes of races. The natural impulse for the gambler is to bet everything the gambler has on the horse that's supposed to win. But when the gambler adopts this policy, the gambler is sure to lose everything on the first bad tip. Alternatively, the gambler can play it safe and bet a minimal amount on each tip. This squanders the considerable advantage the inside tips supply.

In Kelly's analysis, the gambler should be interested in compound return on capital. Kelly showed that the same math Shannon used in Shannon's theory of noisy communications channels applies to the gambler. The gambler's optimal policy is to maximize the expected logarithm of wealth. Though an aggressive policy, this offers important downside protection. Since log(0) is negative infinity, Kelly concludes that the ideal gambler should never accept even a small risk of losing everything. The present disclosure contemplates taking this into account for implementing various embodiments of the system and method of the present disclosure.

The present disclosure further contemplates taking into account the William Poundstone book "Fortune's Formula" (Copyright © 2005, by William Poundstone; published in 2005 by Hill and Wang) formula that provides that: "You should wager this fraction of your bankroll on a favorable bet: edge/odds. The 'edge' is how much you expect to win, on the average, assuming you could make this wager over and over with the same probabilities. 'Odds' means the public or tote-board odds. It measures the profit if you win." The present disclosure contemplates the use of this concept or adaptations thereof in various embodiments of the present disclosure.

Reference will now be made to examples of the present disclosure, various embodiments of which are illustrated in the figures. Each example is provided by way of explanation of the present disclosure, and not meant to be a limitation of the present disclosure. For instance, features illustrated or described with respect to one embodiment may be used with another embodiment to yield still a further embodiment. It is intended that the present disclosure encompass these and other modifications and variations as come within the scope and spirit of the present disclosure.

In various embodiments, the present disclosure relates to systems and methods that enable a prize fund that is funded with fiat currency with at least a portion of the prize payout from the prize fund made in cryptocurrency. One of the aspects of various embodiments is that the prize fund ensures a theoretical "Return To Player" or "RTP" as well as gross revenue for the gaming establishment regardless of exchange or trading value volatility of the cryptocurrency to be awarded as prizes from the prize fund. These ensured values of both RTP and gaming establishment gross revenue are provided by automated processes of the system or method that address fluctuations in the cryptocurrency's exchange or trading value in respect to the desired theoretical payout outcomes.

In various embodiments, the system and method provide an automated periodic prize fund portfolio balancing process. This periodic prize fund portfolio balancing process is based on Shannon's Demon or an adaptation thereof, thereby ensuring that the prize fund maintains its theoretical RTP and gross revenue for the gaming establishment regardless of exchange or trading value volatility of the cryptocurrency to be awarded as prizes. The automated periodic prize fund portfolio balancing process is based on separate rules and in some cases specific to the type or types of the cryptocurrency to be awarded as prizes. Optionally, the present disclosure contemplates that this automated periodic prize fund portfolio balancing process can incorporate the Kelly criterion or an adaptation thereof across a plurality of prize funds that are also balanced by the Shannon's Demon or an adaptation thereof. These automated balancing processes contemplated by the present disclosure enable a prize fund to be established that receives fiat currency as wagers and dispenses at least a portion of its prizes as cryptocurrency coins over an extended time period for at least one drawing or game. These embodiments are particularly suited for prize funds typical of lottery instant ticket, lottery draw games, as well as Class II and Class III gaming machines.

In various embodiments, the system and method provide a variable portion of cryptocurrency automatically purchased from an exchange at the time a prize is won. This embodiment has the advantage of providing immunity from cryptocurrency volatility, since a static theoretical amount of fiat currency is used to purchase a variable amount of cryptocurrency at the time of the prize awarded resulting in the percentage of the prize fund in terms of fiat currency being constant with the amount of cryptocurrency fluctuating depending on the exchange rate at the time of the prize award. This embodiment is particularly suited for Class II and Class III gaming machine awards and possibly lottery instant tickets and draw games. This embodiment can also be utilized for instant tickets and draw games if the prize display award was in fiat currency denominations with an option to cash out in cryptocurrency or a secondary "game" is presented (e.g., Internet web site link for instant tickets with a generic "you won cryptocurrency" indicia) such that the secondary "game" simply awards a prize in cryptocurrency that is equivalent to the exchange rate for the fiat currency prize value that was not previously revealed to the player or consumer.

In various embodiments of the present disclosure, the systems and methods enable a consumer or player to cash out prizes won in cryptocurrency without necessarily having a previously established digital wallet. These embodiments assist in overcoming reluctance of consumers or players to accept prize winnings in cryptocurrency by the gaming establishment essentially constructing the digital wallet for the consumer or player—a.k.a. "Winning Wallet" or "W^2". In various such embodiments, the gaming establishment constructed Winning Wallet can be a "hot" wallet (online, capable of directly connecting to the Internet) while in other such embodiments the gaming establishment constructed digital Winning Wallet can be a "cold" wallet (offline, with no direct connection to the Internet). In various embodiments, the Winning Wallet offered by the gaming establishment will enable the consumer or player to stage the cryptocurrency after the Winning Wallet is initially accessed. In other words, the consumer or player can effectively transfer cryptocurrency from the Winning Wallet to their own (newly created wallet) in a process that is transparent to the consumer, and the consumer can elect to keep the awarded Winning Wallet and change its password. In various embodiments, the gaming establishment offering of a preconstructed digital wallet for the consumer or player overcomes various barriers of acceptance for laymen to receiving funds in cryptocurrency while at the same time not alienating people familiar with cryptocurrency This can possibly increase the potential pool of consumers or players to a particular game such as people interested in cryptocurrency, but not necessarily gaming) or gift cards.

In various embodiments, the system and method provide for printing a cold Winning Wallet on instant tickets or gift cards underneath a Scratch-Off Coating ("SOC") as well as on draw game winning tickets and gaming machine Ticket-In Ticket-Out ("Tito") tickets. This cold Winning Wallet can include both machine readable variable indicia (e.g., "Quick Response" or "QR" code) and human readable variable indicia of at least one asymmetrical public and private key pair associated with a cryptocurrency wallet with a valid deposit equivalent to the prize or gift card value—a.k.a. Winning Wallet. This embodiment has the advantages of the high level of security of cold wallets as well as a comparative ergonomic interface for first time consumers or players. Additionally, this embodiment is also compatible with more seasoned cryptocurrency consumers or players that already have their own digital wallet, since any cryptocurrency funds can be transferred from the Winning Wallet to their own personal digital wallet.

In various embodiments, the system and method provide for printing machine readable and human readable indicia that links to a gaming institution or gift card created hot Winning Wallet that is funded in cryptocurrency coin. This hot Winning Wallet can be embodied as both machine readable and human readable variable indicia of an Internet link to a preloaded digital wallet with the appropriate authentication information embedded in the link such that a consumer or player has immediate access to the cryptocurrency funds. In various embodiments, as previously discussed, the system and method can provide the consumer or player the opportunity to transfer any or all cryptocurrency from the hot Winning Wallet to their own wallet in a seamless manner or create their own new wallet. In various embodiments, any newly created consumer or player wallet can be "deterministic" with a consumer or player entered mnemonic sentence becoming, via the BIP-39 standard ("Bitcoin Improvement Proposal 39"), a 512-bit seed for the consumer or player's wallet's public and private keys. With these embodiments, the hot Winning Wallet can optionally be generated and funded in advance (e.g., at the time of an instant ticket digital generation) and linked to the consumer or player when the prize is awarded or gift card purchased, or alternatively the hot Winning Wallet can be generated and/or funded at the time the prize is awarded or gift card purchased.

In various embodiments, the system and method can provide a cold Winning Wallet where the at least one asymmetrical public and private key pair associated with the Winning Wallet is embodied in a standard ISO/IEC 7810 ID-1 plastic card's embedded tamper-resistant microprocessor configured with an ISO/IEC 14443 contactless communications interface. In these embodiments, enabling the embedded secure microprocessor to communicate with any ISO/IEC 14443 Near Field Communication ("NFC") capable device (e.g., mobile phone) effectively makes the card's embedded secure microprocessor the cold Winning Wallet. With these embodiments, the consumer or player can be provided the Winning Wallet either before (e.g., lottery or casino loyalty card, casino hotel key) or after winning a prize in cryptocurrency. Alternatively, the Winning Wallet of these embodiments can be a gift card for cryptocurrency that is purchased with fiat currency. Regardless of the organization providing the card, the consumer or player can also be provided with an application that can run on their NFC enabled device that can enable them to access and secure the microprocessor Winning Wallet with their own authentication data. These embodiments have the advantages of very high security and an ergonomic interface although they may have higher costs associated with the card and microprocessor.

In various embodiments, the system and method provide a hot Winning Wallet where the at least one asymmetrical public and private key pair associated with the Winning Wallet is embodied in an application that is downloaded to the consumer or player's smart phone, tablet, or computer. With these embodiments, the redemption code printed on a winning ticket (e.g., instant ticket validation number, draw or Tito ticket serial number) can be scanned by the consumer or player device (with the application running thereon), which subsequently communicates with a central site to validate the ticket and change its status to "paid" in a database. When the device running the application transmits the validation request it also transmits its public key to the central site thereby enabling the central site to pay the prize by moving the appropriate value of cyber coins to the consumer or player's wallet embodied in the device and application. Alternatively, the hot Winning Wallet embedded in the downloaded application can only store the public key of an existing (i.e., already established) consumer or player's digital wallet. With this alternative embodiment, the consumers existing digital wallet effectively becomes the winning wallet.

In various embodiments, cryptocurrency is offered as prizes or gift card funding assuming the consumer or player placed a wager or made a purchase with fiat currency. With these embodiments, the problems of managing a prize fund or gift card payable in cryptocurrency and cashing out become effectively managed by the devices, methods, and systems disclosed herein by providing a secure, reliable, predictable distribution of funds in cryptocurrency to consumers or players whether they have a previously established cryptocurrency digital wallet or not.

Various embodiments of the present disclosure can be implemented as methods, of which examples have been provided. The acts performed as part of the methods may be ordered in any suitable way. Accordingly, embodiments may be constructed in which acts are performed in an order different than illustrated, which can include performing some acts simultaneously, even though such acts are shown as being sequentially performed in illustrative embodiments.

Figure 2A:
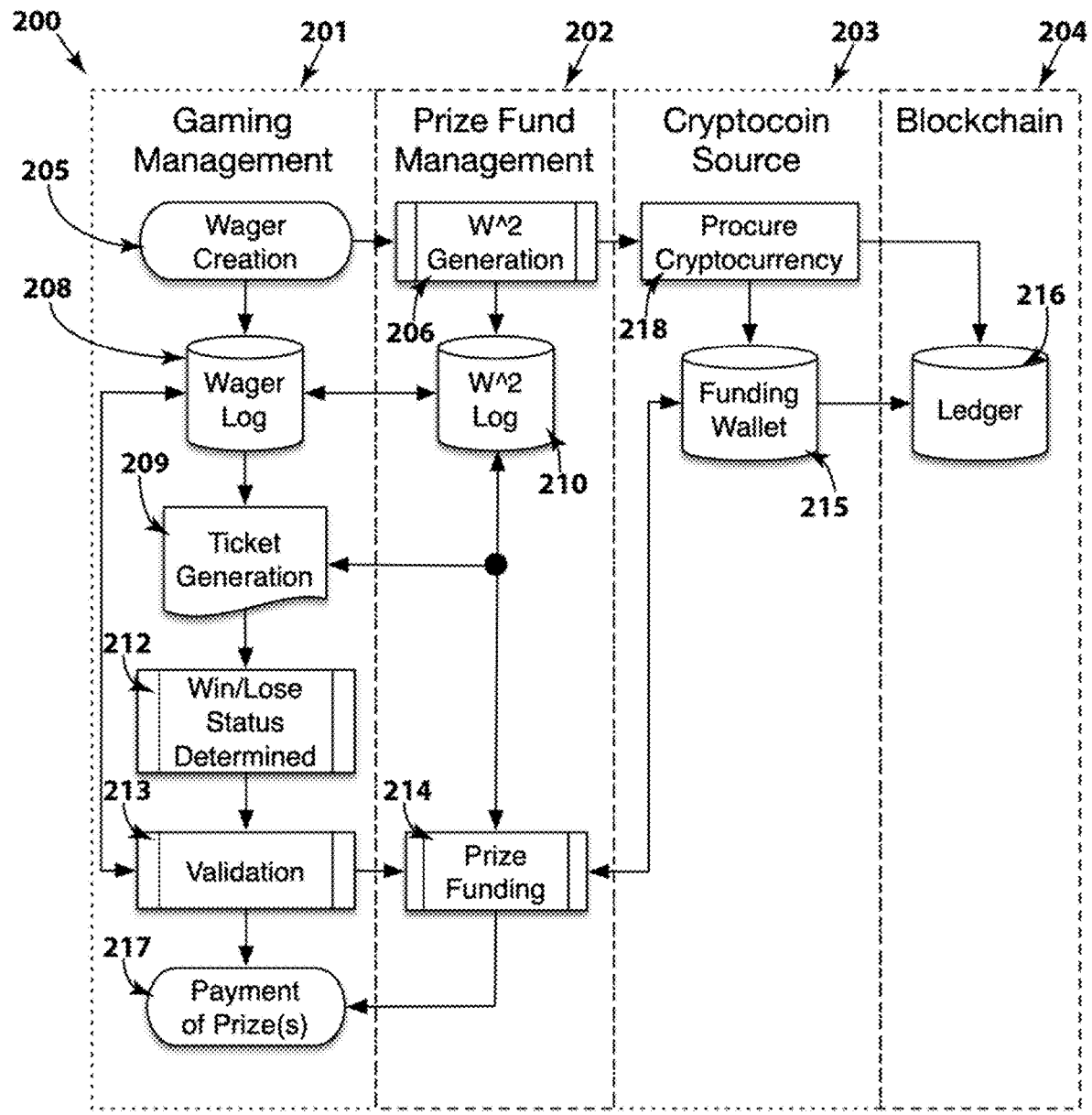
FIG. 2A is a first overall block diagram representative example providing a schematic graphical overview of a system for lotteries capable of accepting wagers in fiat currencies and paying out prizes in cryptocurrencies in accordance with of one example embodiment of the present disclosure.
Figure 2B:
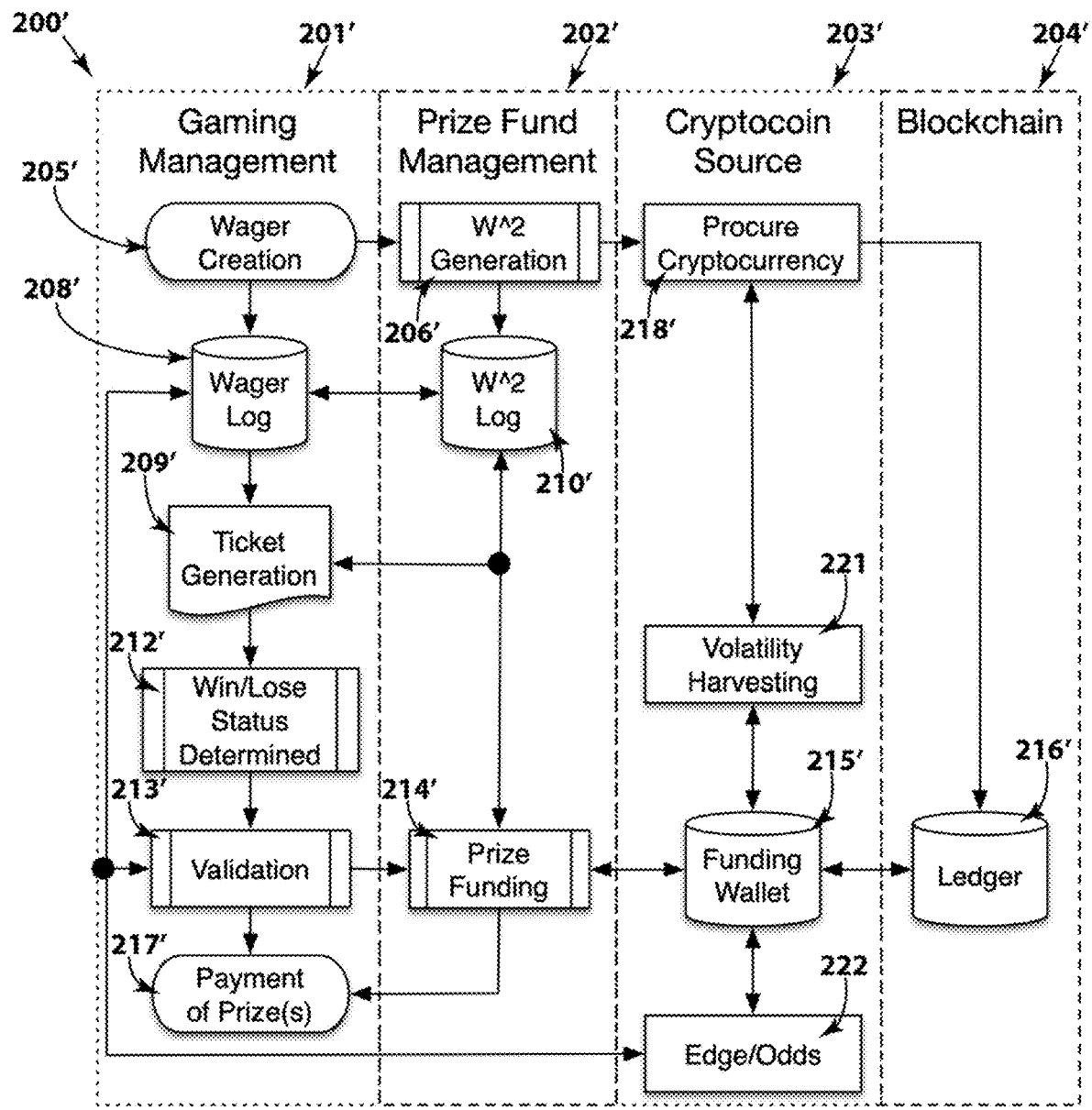
FIG. 2B is a second overall block diagram representative example providing a schematic graphical overview of a system for lotteries capable of accepting wagers in fiat currencies and paying out prizes in highly volatile cryptocurrencies purchased in advance while mostly maintaining a consistent prize fund and Return To Player ("RTP") in accordance with of one example embodiment of the present disclosure.
Figure 2C:
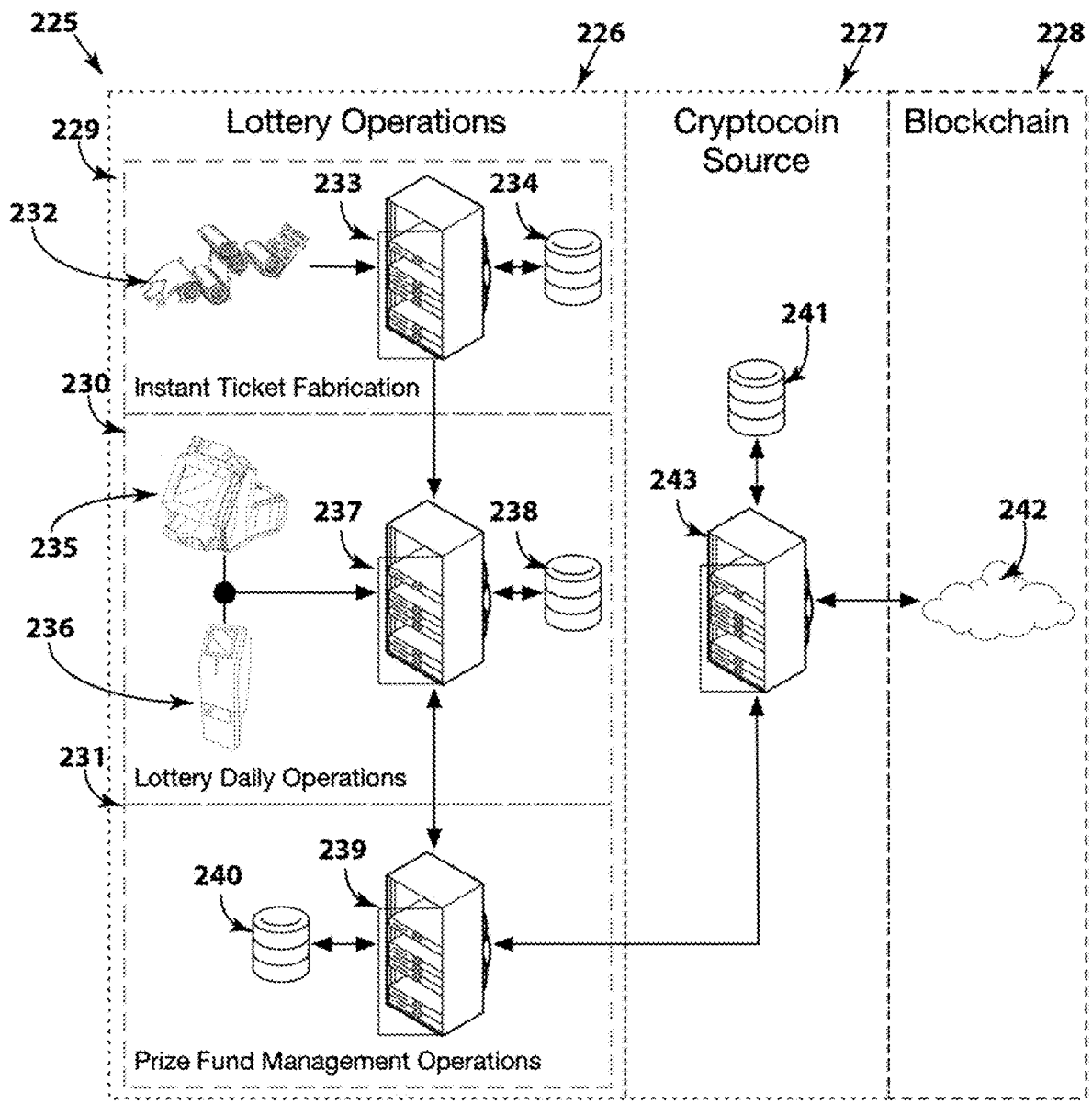
FIG. 2C is a representative example high level hardware architecture diagram of the key components associated with the system representative block diagrams of FIGS. 2A and 2B.

FIGS. 2A, 2B, and 2C taken together provide example embodiments of the cryptocurrency funding mechanisms of various different types of exemplary devices (e.g., FIGS. 3A thru 3F and 3H) utilized for lottery gaming. FIG. 2A illustrates a first embodiment of the cryptocurrency funding mechanism for lottery prizes that are awarded in cryptocurrency. FIG. 2B illustrates the cryptocurrency funding mechanism for lottery prizes awarded in cryptocurrency that were funded in advance of the prize award yet substantially maintain a theoretical prize fund and RTP. FIG. 2C illustrates the architecture diagram of the key components associated with the system representative block diagrams of FIGS. 2A and 2B.

In various embodiments of the present disclosure, a prize fund to be funded with fiat currency with at least a portion of the prize payout from the prize fund made in cryptocurrency is enabled and automatically loads any winning amounts of cryptocurrency into the consumer's Winning Wallet at the time a prize is won. This embodiment garners immunity from cryptocurrency volatility by converting a static amount of fiat currency (e.g., the prize amount denominated in fiat dollars) to a variable amount of cryptocurrency (i.e., depending on the exchange rate between the fiat currency and the cryptocurrency when the prize is awarded) at the time of the prize awarded. This results in the percentage of the prize fund in terms of fiat currency being constant with the amount of cryptocurrency fluctuating depending on the exchange rate at the time of the prize award.

In the exemplary system and method 200 and 200' of FIGS. 2A and 2B, this embodiment can be conceptually divided into four processes including "Gaming Management" 201/201', "Prize Fund Management" 202/202', "Cryptocoin Source" 203/203', and "Blockchain" 204/204' as shown in the four columns shown in FIGS. 2A and 2B. In this example, if a particular flowchart function appears completely within a column, its functionality is limited to the data category of the associated column. For example, the W^2 Log 210/210' is exclusively part of the Prize Fund Management process 202/202'.

The system and method 200 begins with Wager Creation 205, which depending on the game being played and the type of the wager, will vary in timing. For example, with lottery instant tickets, Wager Creation 205 can occur long before a consumer purchases a ticket (i.e., actually makes a wager) since the outcome for each instant ticket is predetermined at the time of the instant ticket digital file generation and its associated printing. In other words, the consumer is essentially purchasing a reveal (i.e., scratch-off) of the predetermined event. In contrast, for draw games (e.g., Powerball®, Mega Millions®, Pick-3) Wager Creation 205 occurs at the time the consumer purchases a ticket with the determination of winning or losing status decided by a drawing in the future. However, with these types of wagers, a payable on demand document is generated either before or when the wager is made by a player or consumer.

Regardless of the type of the wager being made, when a Wager Creation 205 event occurs, a W^2 or "Winning Wallet" 206 is generated subsequently. In the context of this disclosure, the Winning Wallet includes at least one pair of public and private asymmetrical cryptographic keys. These asymmetrical cryptographic keys can then be utilized to track ownership, receive, or spend cryptocurrencies. The public (shared) key(s) enables other digital wallets to transfer cryptocurrencies to the Winning Wallet's address. The private (secret) key(s) enables the transfer of cryptocurrency from the Winning Wallet's address (public or shared key) to another digital wallet. The Winning Wallet's private key(s) is/are the cryptographical proof that the player or consumer owns a certain amount of cryptocurrency listed on the Blockchain's 204 Ledger 216, but does not actually "store" the cryptocurrency itself. At this stage in the process, the newly minted Winning Wallet's pair of cryptographic keys are recorded in the W^2 Log database 210.

Depending on the type of wager initiated by the Wager Creation 205 process, the Winning Wallet cryptographic keys may or may not be assigned to a specific wager when recorded in the W^2 Log database 210. For example, in the case of instant tickets where all ticket wagers in a game are created at one time with wagers recorded in a Wager Log 208 (such as a validation file that "links" each printed ticket with an inventory control number to a separate validation number reflecting the win or lose information printed on each ticket as variable indicia) during the Ticket Generation 209 process (such as the instant ticket printing), the Winning Wallet cryptographic keys stored in the W^2 Log 210 are linked to individual wagers (such as via validation numbers or redemption codes) in the Wager Log 208 at the time of instant Ticket Generation 209.

In various embodiments, only winning ticket validation numbers (such as redemption codes) stored in the Wager Log 208 are linked to Winning Wallet cryptographic keys stored in the W^2 Log 210. These embodiments have the logistical advantage of only generating and maintaining the quantity of Winning Wallet cryptographic keys needed to payout winning tickets with the potential disadvantage of reduced security since all entries in the W^2 Log 210 would be known to embody monetary value. In alternative embodiments, all tickets with validation numbers or redemption codes (i.e., both winning and losing instant tickets) are linked to Winning Wallet cryptographic keys stored in the W^2 Log 210. These alternative embodiments have the logistical disadvantage of a large number of Winning Wallets that will never be used with the advantage of potentially higher security than the previous embodiment since the W^2 Log 210 contains wallets with and without monetary value. Alternatively, each Winning Wallet's private key can be destroyed or securely archived in a second encrypted database after the private key is printed or saved on the instant or draw game ticket with only Winning Wallets' public keys saved in the W^2 Log 210.

Regardless of the embodiment used for storing Winning Wallets in the W^2 Log 210, in various embodiments all the instant ticket redemption codes and the Winning Wallet cryptographic key(s) are linked by cryptographic hashes instead of their cleartext values with the cryptographic hashes stored in the Wager Log 208, and optionally the W^2 Log 210. For example, a SHA-256 ("Secure Hash Algorithm", 256-bit output) hash of the cleartext asymmetrical cryptographic keys stored in the W^2 Log 210 and optionally cryptographic "salt" (such as random data added to the asymmetrical keys prior to the hash function) can be saved in the Wager Log 208 with a given redemption code such that when a particular validation number or redemption code is redeemed during the Validation process 213 after an instant ticket is found to display winning indicia (Win/Lose Status Determined 212), the cryptographic hash of the Winning Wallet's asymmetrical keys stored in the Wager Log 208 can be either matched to a similar cryptographic hash in the W^2 Log 210 or alternatively hashes of all of the W^2 Log 210 asymmetrical keys can be calculated in real time to determine which Winning Wallet stored in the W^2 Log 210 is associated with the winning redemption code in the Wager Log 208. This enables the Prize Funding 214 of cryptocurrency to the particular Winning Wallet associated with the redemption code. Alternatively, in a second embodiment, the public keys from the created Winning Wallets are recorded in the Wager Log 208 database with each public key assigned to a specific redemption code. With this alternative embodiment, since the private keys are not saved in the Wager Log 208 database, the security of the system is maintained with the Wager Log 208 only holding enough information to enable funding of cryptocurrency to any Winning Wallet associated with a winning redemption code without the information necessary to remove cryptocurrency from any Winning Wallet. This alternative second embodiment has the advantages of simplicity while maintaining a high level of security.

In the other case of lottery draw game tickets where the Wager Creation 205 event occurs at differing time periods such as whenever the consumer actually makes a wager, the Winning Wallet asymmetrical cryptographic keys are generated individually such as a W^2 Generation 206 for each wager at the time of Wager Creation 205 and immediately stored in the W^2 Log 210. Also, at the time of Wager Creation 205, the Wager Log 208 is updated with the current wager and a ticket is generated (Ticket Generation 209). As with instant tickets, the draw game wager redemption code (e.g., draw game wager serial number) and the Winning Wallet's asymmetrical cryptographic keys are optionally linked by cryptographic hashes or via the Winning Wallet's cleartext public key.

Returning to the Game Management 201 wagering processing, the generated ticket (Ticket Generation 209) will persist in either physical or virtual form until the win or lose status of the ticket is determined (Win/Lose Status Determined 212) such as when the draw game drawing occurs. Once a winning ticket is apparently identified, it is then submitted for Validation 213 by first authenticating the ticket's redemption code in the Wager Log 208 to determine its authenticity and winning status and also by verifying in the Wager Log 208 that the ticket has not been previously paid. Assuming the ticket is in fact a winner, has not been previously paid, and if the prize is to be paid out in cryptocurrency, the Validation 213 process will pass the associated Winning Wallet identification data (e.g., Winning Wallet public key, SHA-256 hash) and winnings amount to the Prize Fund Management's 202 Prize Funding 214 process where the appropriate previously generated Winning Wallet will receive—via its asymmetrical public (shared) key—a transfer of the appropriate amount of cryptocurrency from the Cryptocoin Source's 203 Funding Wallet 215 with the transfer being recorded in the Blockchain's 204 Ledger 216. Thus, at this point, the system and method 200 have duly paid the consumer or player his or her winnings in cryptocurrency.

Prior to transferring the winning cryptocurrency funds from the Funding Wallet 215 to the Winning Wallet, sufficient cryptocurrency funds must first be loaded in the Funding Wallet 215. In one embodiment, the Funding Wallet 215 can be an external cryptocurrency exchange where the appropriate cryptocurrency funds are procured (Procure Cryptocurrency 218) at the time of the prize award. This embodiment has the advantage of financing logistical simplicity, requiring only a straightforward purchase through an existing exchange with the disadvantages of possibly higher costs due to exchange fees for individual transactions as well as the security and complexity issues associated with continuously maintaining an automatic system for purchasing cryptocurrency with fiat currency whenever a new Winning Wallet requires funding. In a second embodiment, the Funding Wallet 215 can be funded by bulk purchases (Procure Cryptocurrency 218) of cryptocurrency with fiat currency sufficient for potentially multiple Winning Wallets to be funded at different times. This embodiment has the advantages of simplicity, possibly lower costs, and possibly higher security with the disadvantage of potential vulnerability to fiat and cryptocurrency exchange rate fluctuations.

Figure 1B:
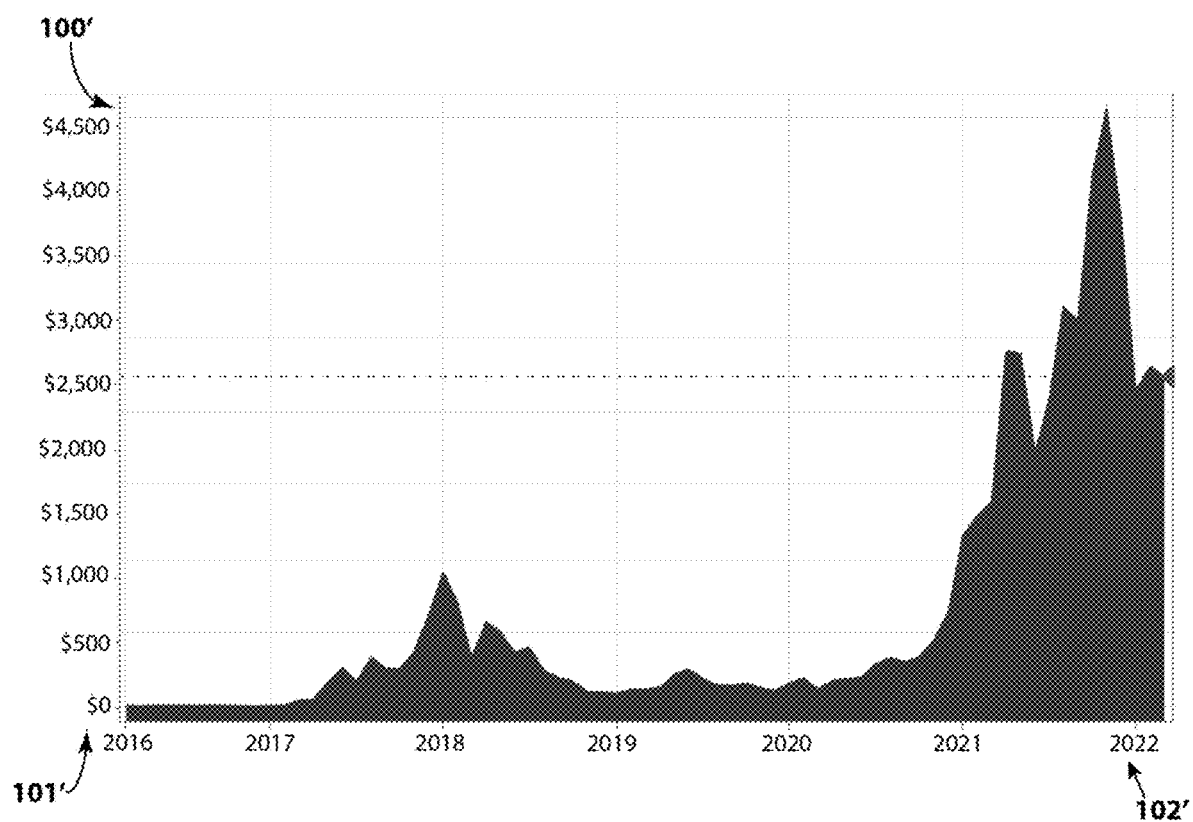
FIG. 1B is a second exemplary view of a prior art graph of the price of a second cryptocurrency (Ethereum) from its introduction to 2022, again highlighting the large amount of volatility in its pricing.

Certain embodiments of the system and method 200 have potential disadvantages. For example, various embodiments of system and method 200 are susceptible to consumers possibly attempting to maximize winnings by simply holding onto winning tickets that identify winnings in cryptocurrency or fiat currency denominations until a more favorable exchange rate materializes in the future. While this consumer strategy can also have the potential to effectively reduce their winnings if fiat to cryptocurrency exchange rates fall, as shown in FIGS. 1A and 1B, there can be significantly long time periods (e.g., months) where the value of cryptocurrency can continue to rise. Additionally, significantly extending the time period that a consumer holds onto a winning ticket before cashing it out can cause substantial logistical funding problems. Also, if the Funding Wallet 215 is loaded with cryptocurrency in advance of the amount of cryptocurrency winnings being determined, the system becomes vulnerable to exchange rate fluctuations with consequently uncertain prize funds and RTP. Finally, if the prizes are stated in fiat currency with the option to accept winnings in cryptocurrency, there is a potential for consumer "sticker shock" from seeing a prize denomination converted from fiat currency to cryptocurrency (such as $1 USD equaling 0.000086 Bitcoin), and possible conflicts over realized prize fund exchange rates verses posted exchange rates on the Internet.

Some of the disadvantages of the embodiment of the system and method 200 can be mitigated with the embodiment of the system and method 200' of FIG. 2B. As before, the system and method 200' of FIG. 2B begins with Wager Creation 205', which depending on the game being played and the type of the wager, will vary in timing. Regardless of the type of the wager being made, when a Wager Creation 205' event occurs a Winning Wallet 206' is subsequently generated. Depending on the type of wager initiated by the Wager Creation 205' process, the Winning Wallet cryptographic keys may or may not be assigned to a specific wager when recorded in the W^2 Log database 210'. Regardless of the form of linking Winning Wallets in the W^2 Log 210' to the Wager Log 208' at the time of Wager Creation 205', the Wager Log 208' is updated with the current wager and a ticket is generated (Ticket Generation 209'). The generated ticket (Ticket Generation 209') will persist in either physical or virtual form until the win or lose status of the ticket is determined (Win/Lose Status Determined 212'). Assuming the ticket is in fact a winner, has not been previously paid, and if the prize is to be paid out in cryptocurrency, the Validation 213' process will pass the associated Winning Wallet identification data and winnings amount to the Prize Fund Management's 202' Prize Funding 214' process where the appropriate previously generated Winning Wallet will receive a transfer of the associated amount of cryptocurrency from the Cryptocoin Source's 203' Funding Wallet 215', with the transfer being recorded in the Blockchain's 204' Ledger 216'.

Thus, so far this system and method 200' is essentially identical to the system and method 200. The significant differences between the two embodiments are the additions of Volatility Harvesting 221 and Edge/Odds 222 processes as illustrated in FIG. 2B. In one embodiment, the Volatility Harvesting 221 process employs an adaptation of Shannon's Demon thereby capitalizing on the fluctuations of the cryptocurrency's price (i.e., volatility harvesting). With Volatility Harvesting 221, instead of simply changing the overall prize fund value relative to fiat currency at a specific time into static cryptocurrency holdings, depending on the appreciation or depreciation of the held cryptocurrency, the prize fund cryptocurrency holdings are periodically balanced to maintain a consistent RTP. This Volatility Harvesting 221 process has the benefit of being much less volatile than typical buy-and-hold cryptocurrency models. Employing the adaptation of Shannon's Demon, the rebalanced portfolio (i.e., cryptocurrency and fiat currency) will inherently be less volatile than the cryptocurrency by itself, and for truly volatile cryptocurrency exchanges with minimal or no exchange costs (or where the exchange costs can be deducted from the prize fund) it can achieve a superior risk-adjusted return thereby stabilizing prize fund consistency.

Returning to FIG. 2B, the Volatility Harvesting 221 process, employing the adaptation of Shannon's Demon, enables cryptocurrency to be purchased in advance of Win/Lose Status Determined 212' (e.g., at the time instant tickets are printed or draw game tickets are purchased) while maintaining a relatively stable prize fund and associated RTP for paying out winning tickets. The Volatility Harvesting 221 process accomplishes this by periodically (such as daily or hourly) automatically rebalancing the cryptocurrency verses fiat currency portfolio of the prize fund such that a 50%/50% balance is maintained in trade value between the two currencies by selling or buying (Procure Cryptocurrency 218') cryptocurrency based on the exchange rate at the time of the rebalancing. Thus, with the Volatility Harvesting 221 process, the total amount of cryptocurrency stored in the Funding Wallet 215' will vary from period to period, but the overall value relative to the fiat currency will be mostly maintained, thereby protecting the prize fund and the RTP. While, this can cause the amount of cryptocurrency to vary within the Funding Wallet 215' below the amount required to pay all prizes, as a practical matter the benefits of harvesting the volatility in the cryptocurrency market in terms of maintaining the prize fund and associated RTP are expected to outweigh the downsides of periodic fluctuations in the amount of cryptocurrency available in the Funding Wallet 215' at any given time. It should be appreciated that the present disclosure contemplates employing other suitable volatility harvesting models (such as but not limited to Black-Scholes, the Heston model of stochastic volatility, the Bruno Dupire's local volatility, or adaptations thereof) that can under some circumstances be preferable than the adaptation of Shannon's Demon.

The Edge/Odds process 222 can optionally augment or substitute for the Volatility Harvesting 221 process by including salient information about the wagers (the "Edge") to adjust the system and process. This is in contrast with the Volatility Harvesting 221 process that is concerned with only the volatility of the exchange rate itself and is essentially agnostic to any information about the ongoing wagers. In various embodiments, the Kelly criterion model or an adaptation thereof can be employed as the Edge/Odds process 222, thereby augmenting or replacing the Volatility Harvesting 221 process in terms of maintaining a consistent prize fund and RTP.

The present disclosure contemplates the use of the Kelly criterion model's analysis or an adaptation thereof that attempts to achieve stability or growth on cryptocurrencies held within the Funding Wallet 215' by leveraging the information concerning the "Edge" about the pending wagers that can be paid in cryptocurrency. The present disclosure contemplates use of the Kelly criterion model's optimal policy to maximize the expected logarithm of the cryptocurrency in the Funding Wallet 215'. In essence, the present disclosure leverages the system and method's "knowledge" of the pending winnings to be paid in cryptocurrency.

With lottery instant tickets, the "Edge" equates to the Edge/Odds process 222 being cognizant of the books of instant tickets available for sale to the public at any one time with the "Odds" being derived from the quantity of winning lottery instant tickets printed that are available for sale. Normally, the total quantity of lottery instant tickets printed greatly exceeds the quantity of lottery instant tickets available for sale at any one time, thereby ensure sufficient stock for several months. Lottery instant tickets are usually arranged in books (such as 100 to 300 tickets to a book) that are activated and placed on sale per "book" unit with the variable quantity of books required to balance a prize fund payout designated as a "pool." One pool at a time is often placed on sale throughout a lottery's jurisdiction, therefore the quantity and payout of winning tickets to be potentially redeemed in cryptocurrency at any particular time will always be less than the total quantity of winners printed for the game and, more to the point, the total quantity of winners that can be presented for payment at any one time can be "known" to the system and therefore utilized to assist in calculating the "Edge" in the Edge/Odds 222 process for any instant game on sale. Thus, by employing the Edge/Odds 222 process, the amount of cryptocurrency that needs to be readily available in the Funding Wallet 215' at any given time can be greatly reduced from the total amount of cryptocurrency needed to fund all the prizes in a given instant ticket game. This difference between the amount of cryptocurrency needed to fund instant ticket prizes likely to be claimed at any given time verses the total amount of cryptocurrency required for an entire game enables the Procure Cryptocurrency process 218' to be time sensitive and therefore more strategic. In other words, the Volatility Harvesting process 221 can utilize the difference in cryptocurrency immediate requirements for prize funding verses the entire instant ticket game's requirement for prize funding as the variable funding for its Volatility Harvesting 221 periodic portfolio rebalancing. Thus, by providing the Edge/Odds 222 process with the instant ticket books on sale or the pool of instant tickets being sold by lottery retailers, the Edge/Odds 222 process can enable dynamic procurement of cryptocurrency, minimizing cash outlays and potentially profiting from exchange rate fluctuations.

With lottery draw games, the Edge/Odds process 222 can function in a different manner since draw games are not predetermined and by definition accept wagers on a drawing in the future. Therefore, with draw games the "Edge" is partially derived from knowing the exact time that the cryptocurrency funds for paying winners for a particularly draw game will be "known" (i.e., when the drawing occurs) to the system and method with the amount of winnings determined by the quantity of wagers made for a given draw game that can potentially pay off in cryptocurrency being the "Odds." This "Edge" can be further enhanced by calculating the arithmetic mean (typically abbreviated by the Greek letter mu, "μ") and standard deviation (typically abbreviated by the Greek letter sigma, "σ") for the potential total of cryptocurrency winning prizes for a given draw game and adding cryptocurrency to the Funding Wallet 215' only prior to the drawing where the amount of funding is the arithmetic mean (μ) plus one, two, or three standard deviations (σ, 2σ, or 3σ). In statistics, the standard deviation for a population is a measure that is used to quantify the amount of variation or dispersion of a set of data values. A standard deviation close to zero indicates that the data points tend to be very close to the mean of the set, while a high standard deviation indicates that the data points are spread out over a wider range of values. For the normal (Gaussian) distribution, the values less than one standard deviation (σ) away from the mean (μ) account for 68.27% of the set; while two standard deviations (2σ) from the mean (μ) account for 95.45%; and three standard deviations (3σ) account for 99.73%. Thus, for draw games, the "Edge" for paying out prizes can be quantified as μ+σ, μ+2σ, or μ+3σ depending on how often (i.e., the level of risk) the lottery desires that it may have to procure additional cryptocurrency immediately after a drawing assuming the total amount of winners in cryptocurrency exceeds the precalculated threshold at whatever the exchange rate is at the time.

In various embodiments, the system and method can require the consumer to declare at the time they make the draw game wager whether the consumer would like to receive their winnings (if any) in cryptocurrency. These embodiments have the advantage of increasing the "Edge" with the Edge/Odds process 222 by decreasing the total amount of cryptocurrency required for the draw game Funding Wallet 215' with the disadvantage of less flexibility for the consumer. In a second related embodiment, certain draw game prize levels (e.g., grand prize in Powerball or Mega Millions or small prizes) can be forbidden to be paid in cryptocurrency to reduce the distance the standard deviation (σ) deviates away from the mean (μ), or in other words reduce the overall risk to the lottery system.

FIG. 2C illustrates the hardware 225 including certain components of the system of FIGS. 2A and 2B. In contrast to the diagrams of FIGS. 2A and 2B, only three columns are shown in FIG. 2C because both the Gaming Management (201/201') and Prize Fund Management (202/202') columns merge into one Lottery Operations 226 column when viewed from the perspective of the hardware architecture of this example system. Additionally, in certain embodiments, the Cryptocoin Source 227 column can also be supported by Lottery Operations 226 hardware; however, it is illustrated as a separate column 227 in FIG. 2C since other embodiments (e.g., supporting the Funding Wallet 215/215' via an exchange) can utilize another entity for this functionality. Nevertheless, with various embodiments, the Blockchain 228 column, by definition, will be maintained by entities separate from Lottery Operations 226.

As shown in FIG. 2C, Lottery Operations 226 is subdivided into three functions including: Instant Ticket Fabrication 229, Lottery Daily Operations 230, and Prize Fund Management Operations 231. Starting with Instant Ticket Fabrication 229, lottery instant tickets are printed 232 each with unique inventory control numbers that are then "linked" to their validation and ship files (i.e., the printed tickets that are to be shipped to the lottery warehouse) generated by an in-house server 233 and recorded in a database 234. Historically, the Instant Ticket Fabrication facility 229 due to logistical and security concerns, is physically separate from the Lottery Daily Operations facility 230. The generated lottery instant tickets, validation files, and ship files are then transferred to Lottery Daily Operations 230 facility with the associated validation and ship files loaded into non-volatile memory 238 database. Thus, the Lottery Daily Operations 230 server 237 and associated non-volatile memory 238 are equipped with the information necessary to support lottery instant ticket sales and redemption.

In addition to lottery instant tickets, the Lottery Daily Operations 230 facility's server 237 also supports the sales of draw games. Unlike lottery instant games, draw game tickets are printed at the time of sale by retailer lottery terminals 235 or self-service kiosks 236. Therefore, the validation file for draw games maintained on the server's 237 non-volatile memory 238 includes a dynamic database file with new wagers being continuously added until shortly before the time of the drawing. Nevertheless, both the instant ticket validation and the draw game validation files are maintained by central server(s) 237 and associated non-volatile memory 238 databases at the Lottery Daily Operations 230 facility. Consequently, both the instant ticket and draw game sales data can be made available to the Prize Fund Management Operations' 231 server 239 via a designated portal. In various embodiments, this designated portal can be a point-to-point Virtual Private Network (VPN) with a suitable authentication protocol (e.g., Challenge-Handshake Authentication Protocol or "Chap", Extensible Authentication Protocol or "EAP", etc.) between the two servers 237 and 239.

In various embodiments, the Prize Fund Management Operations' 231 server 239 can be collocated in the same facility and/or equipment rack as the Lottery Daily Operations 230 facility's server 237. In other embodiments such as shown in FIG. 2C, the Lottery Daily Operations 230 server 237 and Prize Fund Management Operations' 231 server 239 and associated non-volatile memory 240 databases are physically located in a different facility. Regardless of the physical facility that the Prize Fund Management Operations 231 server 239 is located, since a significant portion of the system of the present disclosure (e.g., 206/206', 210/210', 214/214') resides on the Prize Fund Management Operations' 231 server 239 and associated non-volatile memory 240 database; for security, simplicity, reliability, and conformance with existing lottery gaming standards (e.g., Multi-State Lottery Association or "MUSL"), the Prize Fund Management Operations' 231 server 239 and associated non-volatile memory 240 can reside on a separate physical server 239 than the Lottery Daily Operations' 230 server 237.

The Cryptocoin Source 227 server 243 is linked to the Prize Fund Management Operations' 231 server 239 and interfaced via a second VPN and authentication protocol. As before, depending on the embodiment, the Cryptocoin Source 227 server 243 and associated non-volatile memory 241 database can be collocated at the Prize Fund Management Operations 231 facility, but for security concerns can be located in a different facility or at least a different secure area. This is because the Cryptocoin Source 227 server 243 and associated non-volatile memory 241 database maintain the Funding Wallet 215/215' as well as Procure Cryptocurrency 218/218' processes, which literally control and maintain at least a portion of the winnings for each game implemented using the system and method of the present disclosure. Additionally, the Cryptocoin Source 227 server 243 also communicates with the Blockchain 228 ledger stored in the cloud 242 and therefore communicates outside of trusted facilities. In an alternative embodiment, the Cryptocoin Source 227 server 243 can be a service provided by a third party Exchange.

Figure 2D:
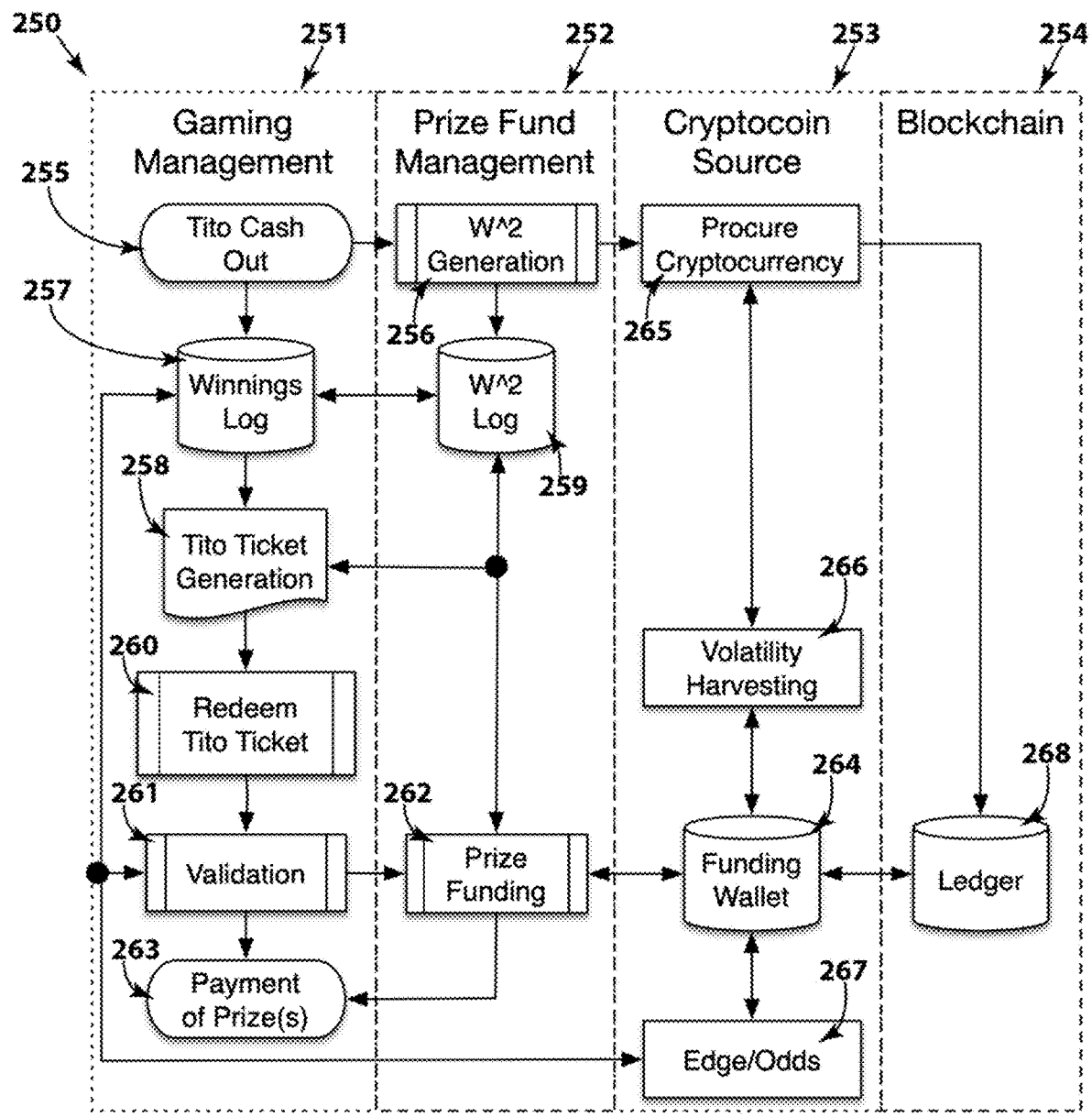
FIG. 2D is an overall block diagram representative example providing a schematic graphical overview of a system for Class II and Class III gaming machines capable of accepting wagers in fiat currencies and paying out prizes in cryptocurrencies in accordance with of one example embodiment of the present disclosure.
Figure 2E:
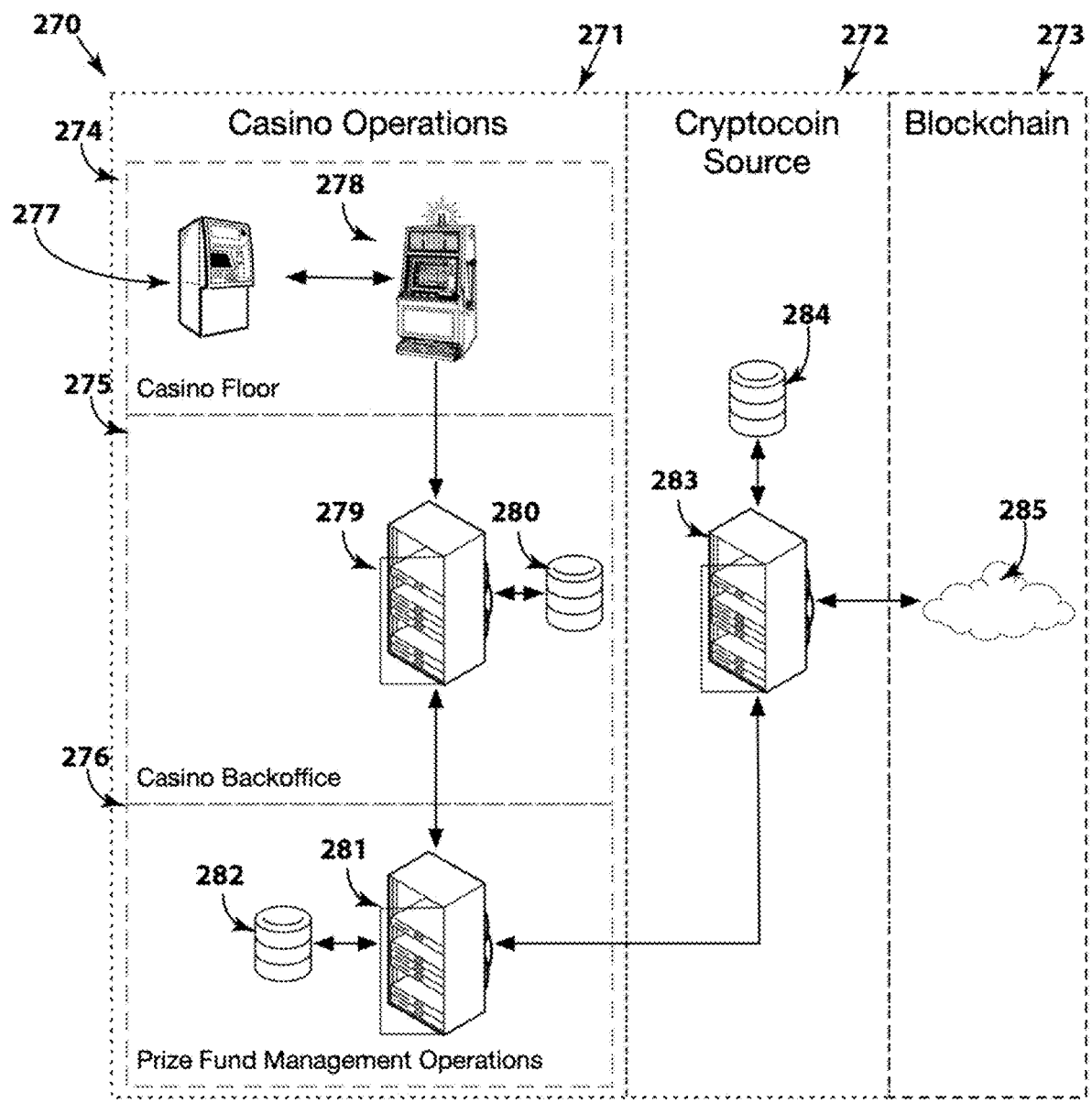
FIG. 2E is a representative example high level hardware architecture diagram of the key components associated with the system representative block diagram of FIG. 2D.

FIGS. 2D and 2E taken together illustrate example embodiments of the cryptocurrency funding mechanisms of Class II and Class III gaming machine Tito ("Ticket-In-Ticket-Out") tickets utilized for cashing out and funding gaming machine such as via payable on demand Tito tickets. FIG. 2D illustrates the cryptocurrency funding mechanism for Tito tickets maintaining a theoretical prize fund and RTP. FIG. 2E illustrates the hardware architecture diagram of certain components of the system 250 of FIG. 2D.

The exemplary system and method 250 of FIG. 2D is conceptually divided into four processes including "Gaming Management" 251, "Prize Fund Management" 252, "Cryptocoin Source" 253, and "Blockchain" 254 by the four columns as shown in FIG. 2D. If a particular flowchart function appears completely within a column, its functionality is limited to the data category of the associated column. For example, the W^2 Log 259 is exclusively part of the Prize Fund Management process 252 in this example.

The system and method 250 of FIG. 2D begins with the consumer or player electing to "cash out" his or her winnings from a gaming machine by initiating a "cash out" request 255 that ultimately generates a payable on demand Tito 258 ticket with an unique redemption code. When or before this occurs, a Winning Wallet (W^2) is generated 256 to hold any potential cryptocurrency winning funds. After the consumer or player initiates the Tito Cash Out 255 request, the Winnings Log 257 is updated with the current winnings and a physical Tito ticket is generated (Tito Ticket Generation 258—e.g., FIG. 3G, callout 350). However, prior to the Tito ticket 350 being printed 258, the Tito ticket Winning Wallet's salient data (an particularly at least one set of asymmetrical public and private cryptographic keys) is first recorded in the W^2 Log 259 and printed on the Tito ticket 350. Alternatively, a link to the Winning Wallet can be printed on the Tito ticket 350 with an associated redemption code (e.g., FIG. 3G, callouts 353 and 357) in the Winnings Log 257. In various embodiments, each Winning Wallet's private key can be destroyed after each private key is printed on the Tito ticket with only Winning Wallets' public keys remaining in the W^2 Log 210. As before, the Winning Wallet cryptographic keys stored in the W^2 Log 259 are linked to the Winnings Log 257 inventory control numbers by either the public key or cryptographic hashes. When the Tito ticket 350 is printed 258, a cleartext embodiment of either the cryptographic keys themselves (via a cold wallet) or a link to the cryptographic keys on the Internet (via a hot wallet) is printed on the Tito ticket 258, such as in both machine (e.g., Quick Response or "QR" code—e.g., FIG. 3G, callout 356) and human readable formats (e.g., FIG. 3G, callout 358).

In one embodiment, the Winning Wallet is funded in cryptocurrency (Prize Funding 262) at the time the Tito ticket is printed 250. This embodiment has the advantage of simplicity with the disadvantage of forcing the consumer to elect to receive the consumer's winnings (if any) in cryptocurrency at the time of cashing out. In a second embodiment, the Winning Wallet is not funded in cryptocurrency at the time the Tito ticket is printed 258. This embodiment has the advantage of enabling the consumer to elect to receive their winnings in fiat currency or cryptocurrency at a later time, with the disadvantage of greater complexity. In this second embodiment, the Funding Wallet 264 can be periodically adjusted by employing the Volatility Harvesting 266, Edge/Odds 267, and Procure Cryptocurrency 265 processes previously discussed to ensure adequate cryptocurrency funds are available for the Tito ticket 350 if the consumer elects to receive cryptocurrency. With various embodiments, when or if the Winning Wallet is funded, the transfer is recorded in the Blockchain's 254 Ledger 268.

Providing the Winning Wallet was not funded at the time the Tito ticket 350 was generated 258 and the consumer or player attempts to redeem the Tito ticket 350 for cryptocurrency 260 at a later time, a Validation process 261 can automatically ensue that verifies via the Winnings Log 257 that the Tito ticket's 350 redemption code is legitimate and has not been previously paid. Assuming this is true, the Prize Funding process 262 can then transfer the cryptocurrency funds from the Funding Wallet 264 to the Tito ticket's 350 Winning Wallet, recording the transfer in the Blockchain's 254 Ledger 268, and thereby paying the prize in cryptocurrency 263.

FIG. 2E illustrates the hardware 270 of certain components of the system 250 of FIG. 2D. In contrast to the diagram of FIG. 2D, only three columns are shown in FIG. 2E, since both the Gaming Management 251 and Prize Fund Management 252 columns merge into one Casino Operations 271 column when viewed from the perspective of the hardware architecture. Additionally, in certain embodiments, the Cryptocoin Source 272 column can also be supported by Casino Operations 271 hardware; however, it is illustrated as a separate column 272 in FIG. 2E since other embodiments can utilize another entity for this functionality. Nevertheless, with various embodiments, the Blockchain 273 column, by definition, can be maintained by an entity separate from Casino Operations 271.

As shown in FIG. 2E, Casino Operations 271 is further subdivided into three functions including: Casino Floor 274, Casino Backoffice 275, and Prize Fund Management Operations 276. Starting with the Casino Floor 274, the consumer or player receives a Tito ticket 350 when the consumer elects to cash out from play on a gaming machine 278 or alternatively from a casino Automatic Teller Machine ("ATM") 277. The server 279 that documents the printed Tito ticket 350 can be located in the Casino Backoffice 275 where the Tito ticket data is recorded on its non-volatile memory database 280. This same server 279 and database 280 can also maintain a log of the value (if any) of the Tito ticket.

With this embodiment, the Casino Backoffice 275 server 279 also maintains communications with the Prize Fund Management Operations' 276 server 281 via a designated portal. This designated portal can be a point-to-point VPN with authentication protocol. At least the Winning Wallets' asymmetrical cryptographic keys are maintained in the Prize Fund Management Operations 276 server's 281 database 282. When a Tito ticket 350 is printed 258, the Casino Backoffice 275 server 279 requests Winning Wallet salient data (e.g., asymmetrical public and private cryptographic keys) along with a secure tag (e.g., secure hash) such that if the Tito ticket 350 is redeemed for cryptocurrency, the Winning Wallet can be securely referenced. The Winning Wallet salient data is utilized to print 258 the Tito ticket 350 at the gaming machine 278 or ATM 277 with the data immediately deleted after printing. The associated Winning Wallet cryptographic tag is saved in the Casino Backoffice 275 database 280 associated with the printed Tito ticket 350.

If the Tito ticket 350 is redeemed for cryptocurrency, the Casino Backoffice 275 server 279 notifies the Prize Fund Management Operations' 276 server 281 via the associated cryptographic tag. At this point, the Prize Fund Management Operations' 276 server 281 looks up at least the asymmetrical cryptographic public key in its database 282 and notifies the Cryptocoin Source 272 server 283 to transfer the appropriate amount of cryptocurrency from its Funding Wallet 264 stored on its local non-volatile database 284 to the Winning Wallet and also registering the transfer on the Blockchain 273 cloud 285.

Figure 2F:
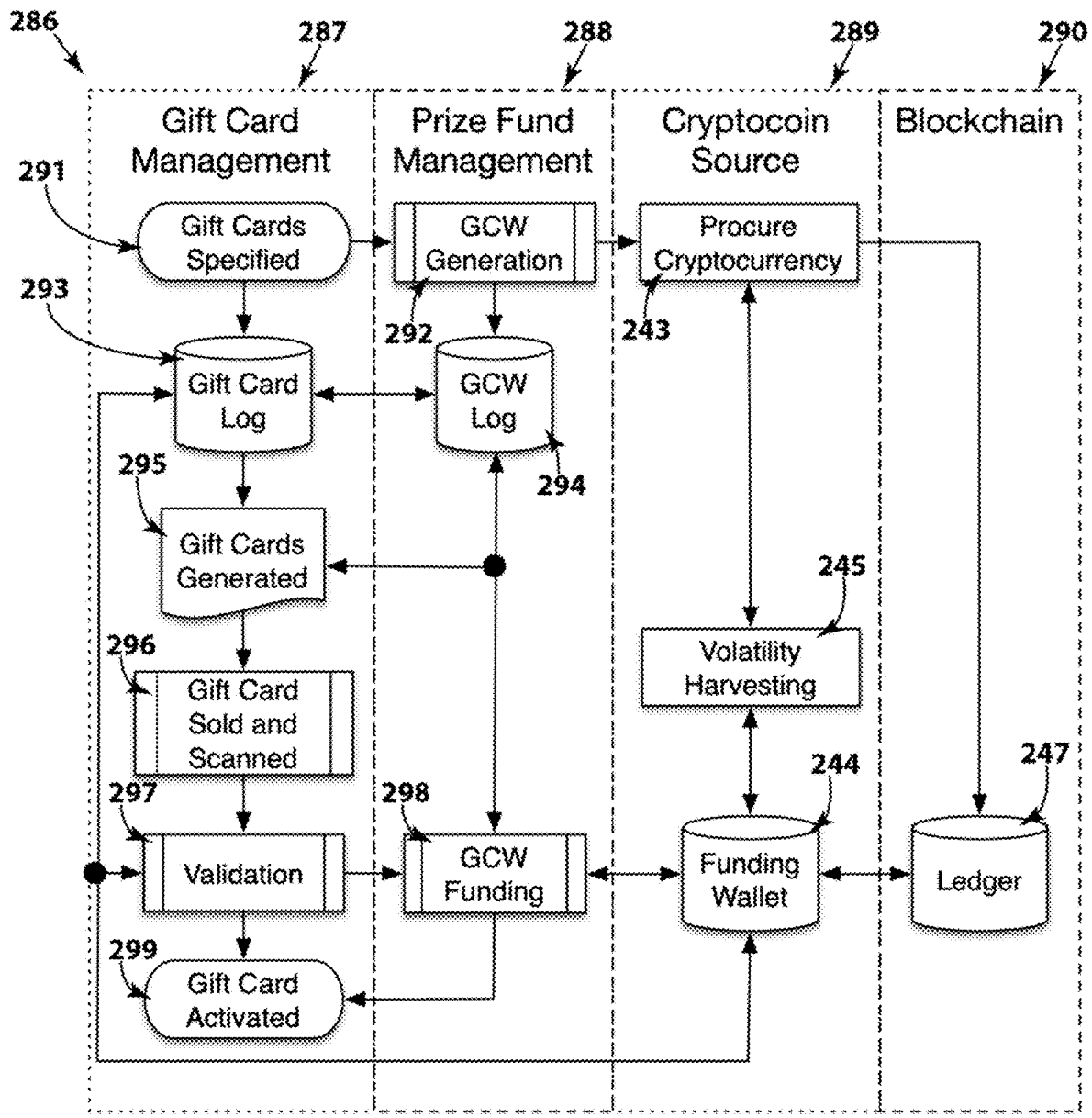
FIG. 2F is an overall block diagram representative example providing a schematic graphical overview of a system for offering gift cards that are purchased in fiat currencies, but are loaded with cryptocurrencies in accordance with of one example embodiment of the present disclosure.
Figure 2G:
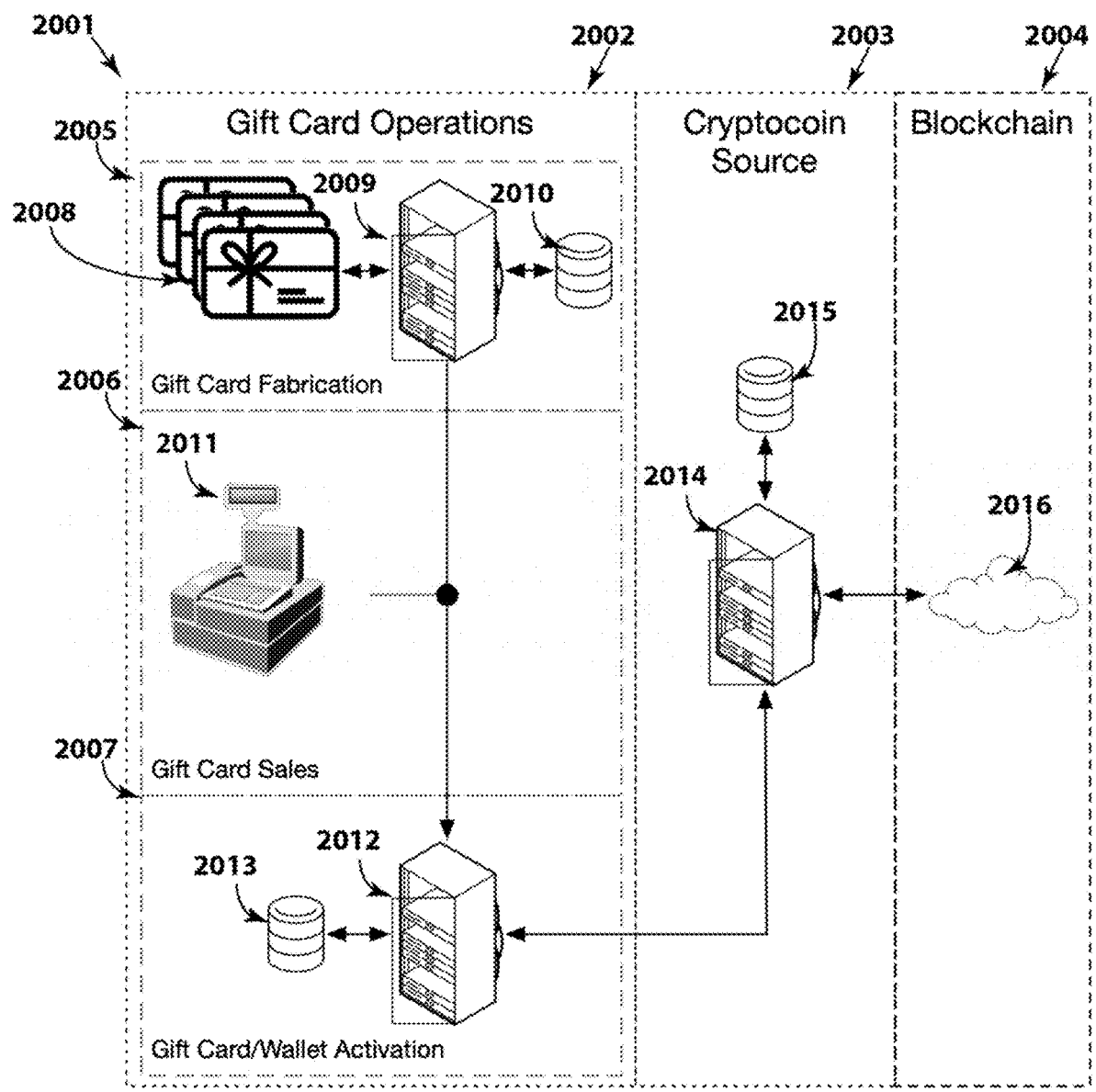
FIG. 2G is a representative example high level hardware architecture diagram of the key components associated with the system representative block diagram of FIG. 2F.

FIGS. 2F and 2G taken together illustrate example embodiments of systems and method providing the cryptocurrency funding mechanisms for payable on demand gift card documents (e.g., FIG. 3I, callouts 380 and 380') that can be purchased with fiat currency from any one of a plurality of commercial retailer gift card kiosks or stands. FIG. 2F illustrates the cryptocurrency funding mechanism for the gift cards. FIG. 2G illustrates the hardware architecture diagram of certain components of the system 286 of FIG. 2F.

The exemplary system 286 of FIG. 2F is conceptually divided into four processes including "Gift Card Management" 287, "Prize Fund Management" 288, "Cryptocoin Source" 289, and "Blockchain" 290 by the four columns as shown in FIG. 2F. This system and method 286 of FIG. 2F begins with the specifications 291 for manufacturing a given quantity and type of cryptocurrency loaded payable on demand gift cards that can be purchased with fiat currency. At this point, the physical embodiments of the gift cards (e.g., FIG. 3I, callouts 380 and 381) are generated 295 with the gift card activation or redemption code (inventory control numbers issued by the gift card company) recorded in a Gift Card Log 293 and each associated Gift Card Wallet ("GCW") generated by process 292 with at least the GCW resulting asymmetrical cryptographic public and private keys stored in a non-volatile GCW Log database 294. Alternatively, each GCW's private key can be destroyed after the private key is printed on the gift card with only the GCWs' public keys saved into the database 294. Similar to the above embodiments, the GCW asymmetrical cryptographic keys stored in the GCW Log 294 are linked to the Gift Card Log 293 by the public key or cryptographic hashes. When the gift cards are fabricated, a cleartext embodiment of either the cryptographic keys themselves (via cold wallet) or a link to the cryptographic keys on the Internet (via a hot wallet) are printed or recorded on the gift cards, such as in both machine (e.g., QR code) and human readable formats (e.g., FIG. 3I, callout 381).

In one embodiment, each GCW is funded in cryptocurrency (GCW Funding 298) at the time the gift card is fabricated. This embodiment has the advantage of simplicity with the potential disadvantages of lower security and loss of consumer choice. In a second embodiment, the GCW is not funded in cryptocurrency at the time the gift card is fabricated. This embodiment has the advantages of enabling the consumer to elect to purchase a variable amount of cryptocurrency at a later time as well as higher security with the disadvantage of greater complexity. In this second embodiment, the Funding Wallet 244 can be periodically adjusted by employing the Volatility Harvesting 245 and Procure Cryptocurrency 243 processes previously discussed to ensure adequate cryptocurrency funds are available for the gift card when the consumer purchases cryptocurrency. With various embodiments, when the GCW is funded, the transfer is recorded in the Blockchain's 290 Ledger 247.

When the consumer purchases the gift card, its redemption code (e.g., FIG. 3I, callout 385) is scanned or entered 296 with the Validation process 297 verifying the authenticity via the Gift Card Log 293 that the gift card is legitimate and has also not been previously purchased. Assuming both to be true, the GCW Funding process 298 can then transfer the cryptocurrency funds from the Funding Wallet 244 to the GCW, recording the transfer in the Blockchain's 290 Ledger 247, and thereby funding the card in cryptocurrency 299.

FIG. 2G illustrates the hardware 2001 of the certain components of the system 286 of FIG. 2F. In contrast to the diagram of FIG. 2F, only three columns are shown in FIG. 2G, since both the Gift Card Management 287 and Prize Fund Management 288 columns merge into one Gift Card Operations 2002 column when viewed from the perspective of the hardware architecture. Additionally, in certain embodiments, the Cryptocoin Source 2003 column can also be supported by Gift Card Operations 2002 hardware; however, it is illustrated as a separate column 2003 in FIG. 2G since other embodiments can utilize another entity for this functionality. Nevertheless, with various embodiments the Blockchain 2004 column, by definition, can be maintained by an entity separate from Gift Card Operations 2002.

As shown in FIG. 2G, Gift Card Operations 2002 is further subdivided into three functions including: Gift Card Fabrication 2005, Gift Card Sales 2006, and Gift Card/Wallet Activation 2007. Starting with the Gift Card Fabrication 2005, physical embodiments of payable on demand gift cards 2008 are fabricated with the gift card associated GCW asymmetrical cryptographic keys printed in cleartext on or in the gift card 2008 for cold wallets and a link to an Internet site providing key access for hot wallets. The server 2009 that documents the gift card fabrication is collocated in the Gift Card Fabrication 2005 facility with the gift card data (including GCW information) recorded on its non-volatile memory database 2010. Optionally, each GCWs private key can be destroyed after the private key is printed on the instant or draw game ticket with only GCWs' public keys saved.

The Gift Card Fabrication 2005 server 2009 also maintains communications with the Gift Card/Wallet Activation 2007 server 2012 via a designated portal. This designated portal can be a point-to-point VPN with authentication protocol. At least the GCW's asymmetrical cryptographic keys are maintained in the Gift Card/Wallet Activation 2007 server's 2012 non-volatile database 2013.

When the gift card is purchased at a retailer's establishment, the retailer's Point Of Sale ("POS") device 2011 can scan or enter the gift card's redemption code (e.g., FIG. 3I, callout 385) and transmit the data to the Gift Card/Wallet Activation 2007 server 2012 that authenticates and ensures the gift card has not been previously purchased. Assuming both verification checks prove to be true, the Gift Card/Wallet Activation 2007 server 2012 then looks up at least the GCW asymmetrical cryptographic public key in its database 2013 and notifies the Cryptocoin Source 2003 server 2014 to transfer the appropriate amount of cryptocurrency from its Funding Wallet 244 stored on its local non-volatile database 2015 to the GCW also registering the transfer on the Blockchain 2004 cloud 2016. The present disclosure contemplates methods of creating gift cards that are funded with fiat currency and payable in cryptocurrency (e.g., NFC enabled plastic gift cards loaded with cold wallet asymmetrical cryptographic keys) that can under some circumstances be preferable than previously disclosed.

Figure 2H:
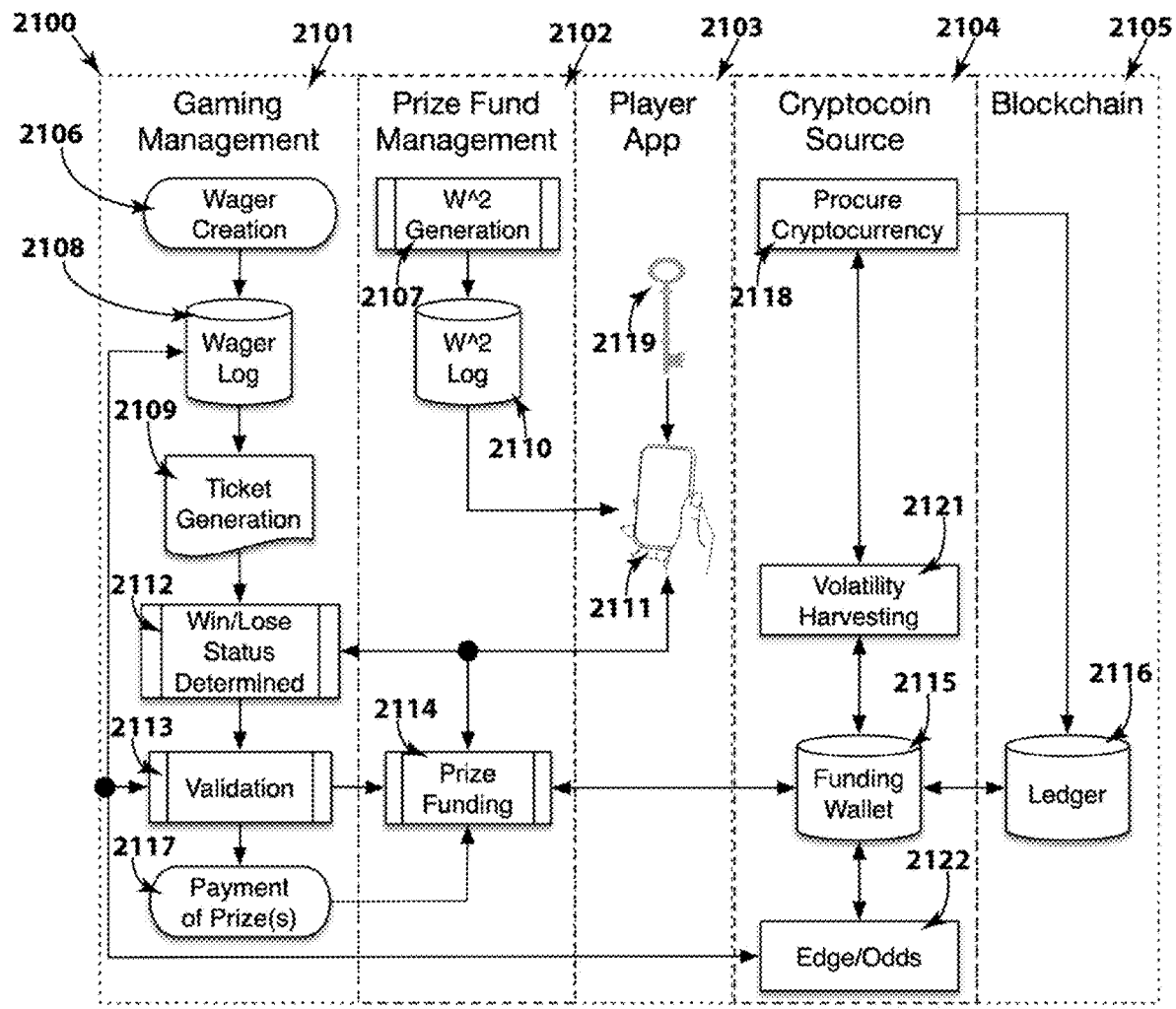
FIG. 2H is an overall block diagram representative example providing a schematic graphical overview of a system for redeeming winning tickets that are purchased in fiat currencies, but prizes are paid with cryptocurrencies in accordance with of one example embodiment of the present disclosure.
Figure 21:
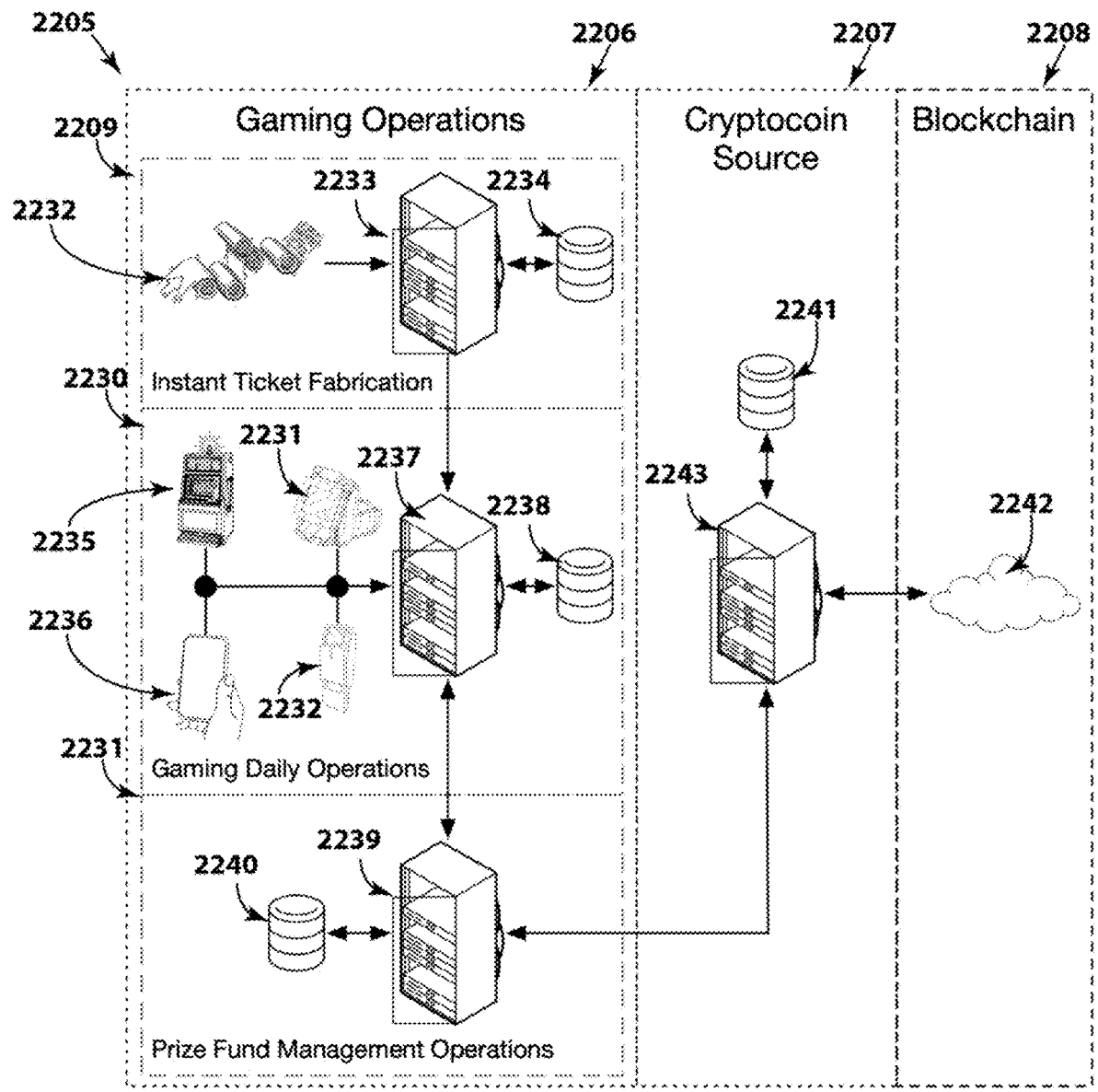

FIGS. 2H and 2I taken together illustrate example embodiments of the cryptocurrency funding systems and method utilizing existing gaming tickets (e.g., FIG. 3K callouts 390, 391, and 392) to enable cryptocurrency payouts via a downloaded application to a consumer's or player's smart phone, smart tablet, or computer that is enabled by the present disclosure. FIG. 2H illustrates the cryptocurrency funding system and method 2100 for the application. FIG. 2I illustrates the hardware architecture diagram of certain components of the system 2100 of FIG. 2H.

As illustrated in FIG. 2H, the system and method 2100 is divided into five columns including Gaming Management 2101, Prize Fund Management 2102, Player App 2103, Cryptocoin Source 2104, and Blockchain 2105. As before, if a particular flowchart function appears completely within a column, its functionality is limited to the data category of the associated column.

The system and method 2100 of FIG. 2H begins with Wager Creation 2106, which depending on the game being played and the type of the wager, will vary in timing. Regardless of the type of the wager being made, a Winning Wallet 2110 is generated, recorded in the Winning Wallet database 2110, and embedded in an application that was downloaded (downloading process not shown in FIG. 2H) onto the consumer or player's device 2111 (e.g., smart phone, tablet, computer). If the consumer or player already possess a digital wallet capable of holding the appropriate type of cryptocurrency, the public key 2119 from the consumer's or player's existing digital wallet can be added to the downloaded application to function as the Winning Wallet.

Regardless of the source of the consumer's or player's Winning Wallet, at the time of Wager Creation 2106, the Wager Log 208' is updated with the current wager and a payable on demand ticket is generated (Ticket Generation 2109). The generated ticket (Ticket Generation 2109) can persist in either physical or virtual form until the win or lose status of the ticket is determined (Win/Lose Status Determined 2112). In this embodiment, the ticket generated can be a known type of ticket with no specific indicia or other embedded mechanism to link to a digital wallet. Thus, to enable payout of prizes in cryptocurrency, an external application 2103 resident on the consumer's or player's device 2111 effectively performs the winner validation function that a gaming terminal can do by scanning the redemption code (e.g. FIG. 3K 394 thru 396) and transmitting the redemption code to the Gaming Management 2101 (FIG. 2H) central site to determine if the validation information is in fact a winner and has not been previously paid 2112 and 2113. Assuming the redemption code identifies a winner 2117, the device and application will pass its associated Winning Wallet's public key to the Prize Fund Management's 2102 Prize Funding 2114 process where the application's Winning Wallet will receive a transfer of the associated amount of cryptocurrency from the Cryptocoin Source's 2104 Funding Wallet 2115 with the transfer being recorded in the Blockchain's 2105 Ledger 2116. As with previous embodiments, Volatility Harvesting 2121 and Edge/Odds 2122 can be optionally employed to potentially aide in wallet funding 2115 and stability.

FIG. 2I illustrates the hardware 2205 of certain components of the system 2100 of FIG. 2H. In contrast to the diagram of FIG. 2H, only three columns are shown in FIG. 2I because the Gaming Management 2101, Prize Fund Management 2102, and Player App 2103 of FIG. 2H columns merge into one Gaming Operations 2206 column in FIG. 2I when viewed from the perspective of the hardware architecture of the system 2100.

As shown in FIG. 2I, Gaming Operations 2206 is subdivided into three functions including: Instant Ticket Fabrication 2209, Gaming Daily Operations 2230, and Prize Fund Management Operations 2231. Starting with Instant Ticket Fabrication 2209, lottery instant tickets are printed 2232 each with unique validation numbers that are then "linked" to their validation and ship files (i.e., the printed tickets that are to be shipped to the lottery warehouse) generated by an in-house server 2233 and recorded in a database 2234. Historically, the Instant Ticket Fabrication facility 2209 due to logistical and security concerns, is physically separate from the Gaming Daily Operations facility 2230. The generated lottery instant tickets, validation files, and ship files are then transferred to Gaming Daily Operations 2230 facility with the associated validation and ship files loaded into non-volatile memory 2238 database. Thus, the Gaming Daily Operations 2230 server 2237 and associated non-volatile memory 2238 are equipped with the information necessary to support lottery instant ticket sales and redemption.

In addition to lottery instant tickets, the Gaming Daily Operations 2230 facility's server 2237 also supports the sales of draw games and Tito tickets. Unlike lottery instant games, draw game and Tito tickets 2235 are printed at the time of sale by terminals (2231, 2232, and 2235). Therefore, the validation file for draw games and Tito tickets maintained on the server's 2237 non-volatile memory 2238 is a dynamic database file with new wagers being continuously added. Nevertheless, the instant ticket, draw game, and/or Tito validation files are maintained by central server(s) 2237 and associated non-volatile memory 2238 databases at the Gaming Daily Operations 2230 facility. Consequently, instant ticket, draw game, and Tito sales data can be made available to the Prize Fund Management Operations' 2231 server 2239 via a designated portal. This designated portal can be a point-to-point VPN with a suitable authentication protocol between the two servers 2237 and 2239.

In some embodiments, the Prize Fund Management Operations' 2231 server 239 can be collocated in the same facility and/or equipment rack as the Gaming Daily Operations 2230 facility's server 2237. In other embodiments as shown in FIG. 2I, the Gaming Daily Operations 2230 server 2237 and Prize Fund Management Operations' 2231 server 2239 and associated non-volatile memory 2240 databases are physically located in a different facility. Regardless of the physical facility that the Prize Fund Management Operations 2231 server 2239 is located, the Prize Fund Management Operations' 2231 server 2239 and associated non-volatile memory 2240 can reside on a separate physical server 2239 than the Gaming Daily Operations' 2230 server 2237.

With this embodiment, cryptocurrency validations and redemptions are conducted via the consumer's or player's personal device 2236 running the downloaded application of the present disclosure. Thus, cryptocurrency prize validation and redemption transactions are initiated by the player's personal device 2236 scanning or entering the redemption code.

The Cryptocoin Source 2207 server 2243 is linked to the Prize Fund Management Operations' 231 server 2239 and interfaced via a second VPN and authentication protocol. As before, depending on the embodiment, the Cryptocoin Source 2207 server 2243 and associated non-volatile memory 2241 database can be collocated at the Prize Fund Management Operations 2231 facility, but for security concerns, can be located in a different facility or at least a different secure area. This is because the Cryptocoin Source 2207 server 2243 and associated non-volatile memory 2241 database maintain the Funding Wallet as well as Procure Cryptocurrency processes that literally control and maintain at least a portion of the winnings for each game provided by the system and method of the present disclosure. Additionally, the Cryptocoin Source 2207 server 2243 also communicates with the Blockchain 2208 ledger stored in the cloud 2242 and therefore communicates outside of trusted facilities. In an alternative embodiment, the Cryptocoin Source 2207 server 2243 can be a service provided by a third party Exchange.

Figure 2J:
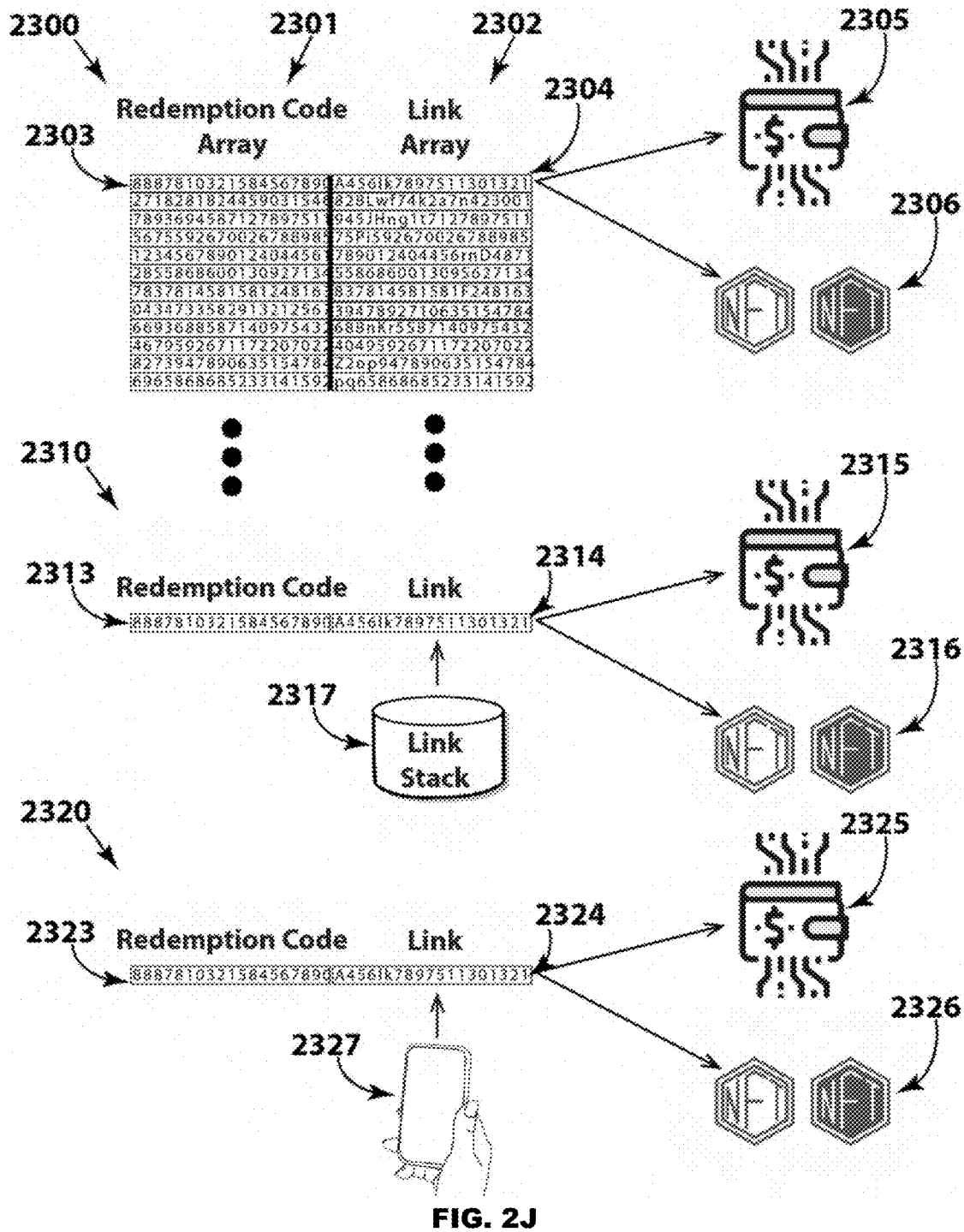
FIG. 2J is a representative example high level database or array arrangement of redemption codes to link codes associated with the diagrams of FIGS. 2A thru 2I.

In the previous exemplary embodiments of FIGS. 2A thru 2I, a redemption code is assigned to a separate link thereby enabling the payable on demand document to be associated with a specific Winning Wallet. FIG. 2J illustrates three different example structures 2300, 2310, and 2320 of how a specific link can be assigned to a specific redemption code in accordance with the present disclosure.

With embodiment 2300, a database is shown containing an array of redemption codes 2301 that are each assigned to a specific adjacent link in a separate but related array 2302. This embodiment is particularly suited to applications of printing lottery instant tickets where a plurality of tickets are created in advance of any game play or related validations as well as gift cards. In structure 2300, redemption code 2303 is assigned to link 2304 by the two arrays proximity in the two dimensional database. Thus, the database correlates redemption code 2303 to Winning Wallet 2305 via the specific link 2304. In this example, the link can be the public key to Winning Wallet 2305, or a cryptographic hash of Winning Wallet's 2305 public and/or private keys, or cyphertext of Winning Wallet's 2305 public and/or private keys, etc. The redemption code 2303 is assigned and correlated to specific Winning Wallet 2305 via its associated link 2304. This is not to infer the link 2304 can only be used to correlate redemption codes 2303 to Winning Wallets 2305. In an alternative embodiment, the link 2304 can be utilized to correlate the redemption code 2303 to a specific Non-Fungible Token (NFT) 2306.

Alternatively, structure 2310 shows redemption code 2313 assigned to link 2314 that was extracted from a database of links 2317 in real time when the redemption code was validated, thereby correlating redemption code 2313 to Winning Wallet 2315 or NFT 2316 via the specific link 2314. This embodiment is particularly suited to draw game and Tito ticket applications. Again, the link 2314 can be the public key to Winning Wallet or NFT 2315/2316, or the cryptographic hash of the Winning Wallet's or NFT's 2315/2316 public and/or private keys, or the cyphertext of Winning Wallet's or NFT 2315/2316 public and/or private keys, etc.

Alternatively, structure 2320 shows redemption code 2323 assigned to link 2324 that was transmitted from an application residing in a consumer's or player's personal device 2327 (e.g., smart phone) in real time when the redemption code was validated, thereby correlating redemption code 2323 to Winning Wallet 2325 or NFT 2326 via the specific link 2324. This alternative embodiment is desirable for lottery instant tickets, draw game tickets, and Tito tickets. Again, the link 2324 can be the public key to Winning Wallet or NFT 2325/2326, or the cryptographic hash of the Winning Wallet's or NFT's 2325/2326 public and/or private keys, or the cyphertext of Winning Wallet's or NFT 2325/2326 public and/or private keys, etc.

Figure 3A:
FIG. 3A is a schematic view of a first representative example of an instant lottery ticket both in an un-played condition and a played ("scratched") condition capable of being purchased with fiat currency and paying out a least a portion of prizes in cryptocurrency using a cold wallet in accordance with of one example embodiment of the present disclosure.
Figure 3B:
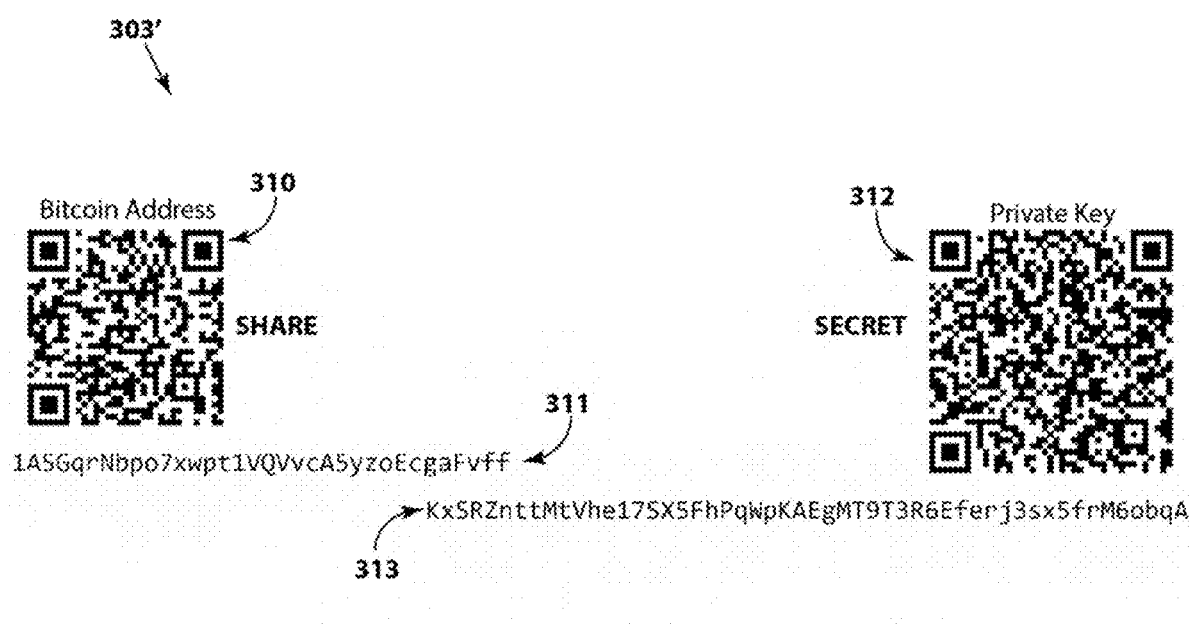
FIG. 3B is an enlarged view of the representative example callout 303' portion of FIG. 3A.
Figure 3C:
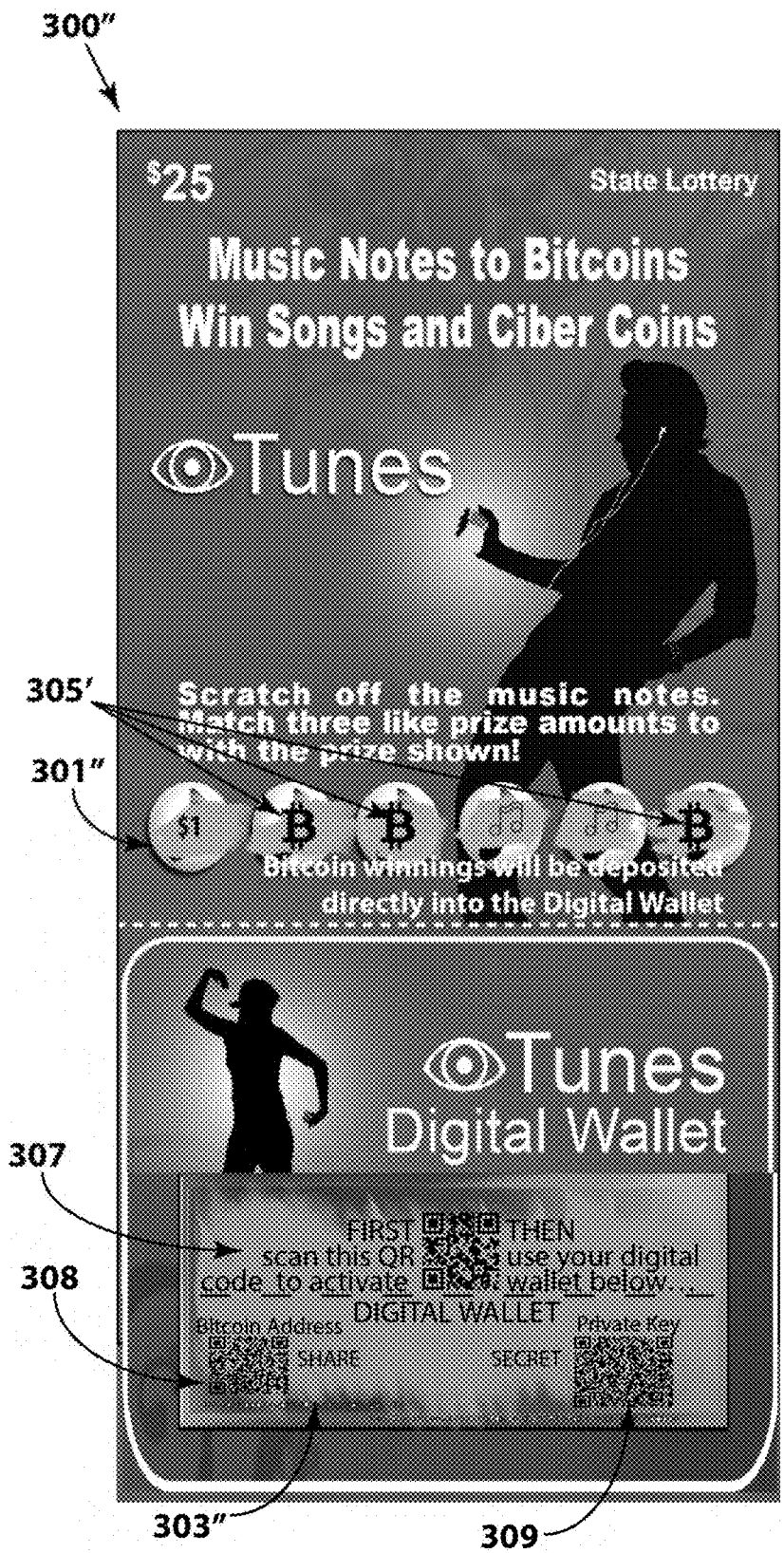
FIG. 3C is a schematic view of a second representative example of the instant lottery ticket in a played condition capable of being purchased with fiat currency and paying out a least a portion of prizes in cryptocurrency using a cold wallet, where the cold wallet is activated via an additional redemption barcode, in accordance with of one example embodiment of the present disclosure.
Figure 3D:
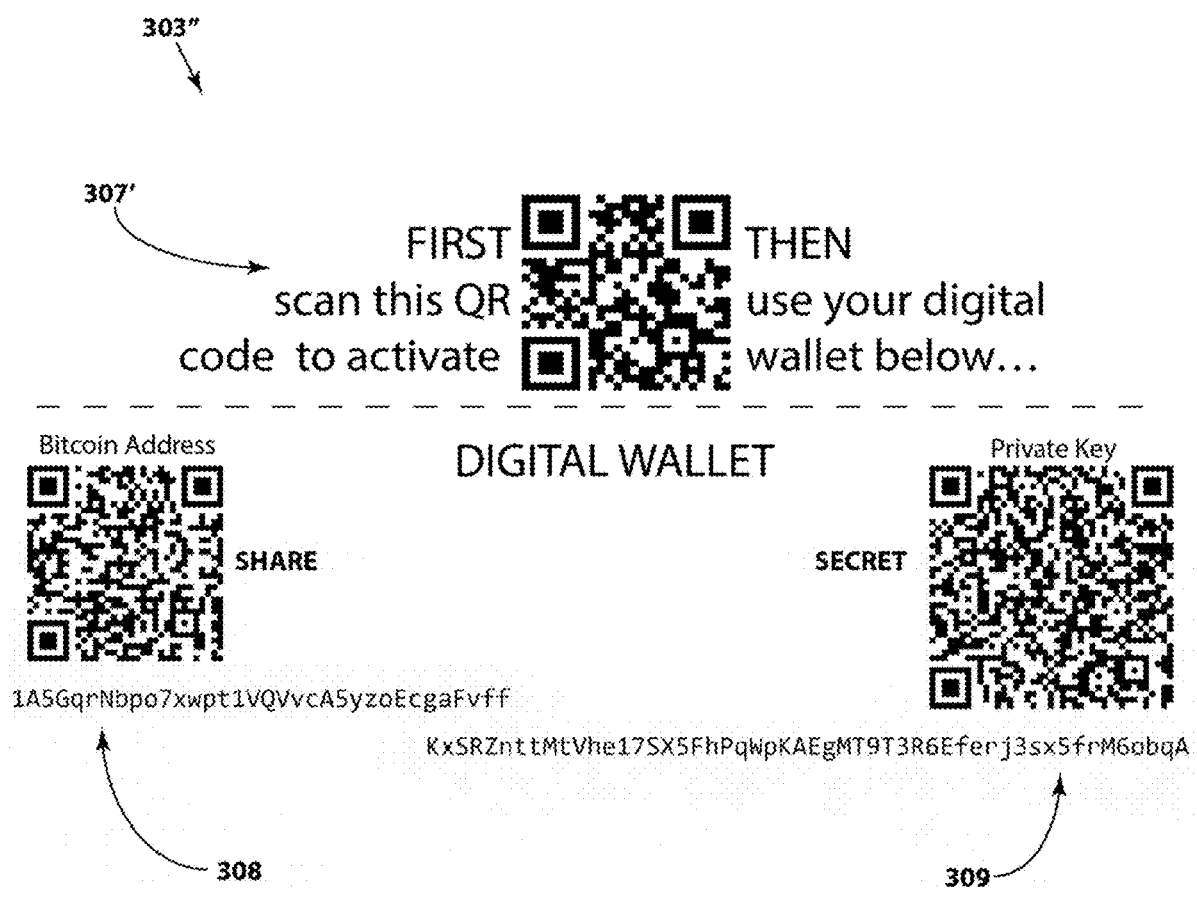
FIG. 3D is an enlarged view of the representative example callout 303" portion of FIG. 3C.
Figure 3E:
FIG. 3E is a schematic view of a third representative example of an instant lottery ticket capable of being purchased with fiat currency and paying out a least a portion of prizes in cryptocurrency using a hot wallet in accordance with of one example embodiment of the present disclosure.

FIGS. 3A thru 3E taken together provide example embodiments of lottery instant tickets where at least a portion of prize winnings is payable in cryptocurrency. FIG. 3A is a schematic view of a first representative example of an instant lottery ticket (both in un-played condition 300 and played or "scratched" condition 300') capable of being purchased with fiat currency and paying out a least a portion of any prizes in cryptocurrency using a cold wallet 303'. FIG. 3B is an enlarged view of the representative example callout 303' of FIG. 3A. FIG. 3C is a schematic view of a second representative example of the instant lottery ticket 300" of FIG. 3A (in played condition) capable of being purchased with fiat currency and paying out at least a portion of any prizes in cryptocurrency using a cold wallet 308, where the cold wallet 308 is activated in a first step by the consumer via a redemption barcode 307. FIG. 3D is an enlarged view of the representative example callout 303" of FIG. 3C. FIG. 3E is a schematic view of a third representative example 315 of a played instant lottery ticket capable of being purchased with fiat currency and paying out at least a portion of any prizes in cryptocurrency using a hot wallet 318.

More specifically, beginning with the first representative example instant lottery ticket 300 and 300' of FIG. 3A, callout 300 illustrates the exemplary ticket in an un-played (unscratched) condition prior to being sold to a consumer with callout 300' showing the same ticket in a played or scratched condition. As shown in FIG. 3A, the exemplary ticket 300/300' is subdivided into two portions including a standard instant lottery game potion 304/304' and a cryptocurrency digital wallet portion 306/306', optionally delineated by a perforation 302. Aside from helping to differentiate this cryptocurrency prize instant ticket from standard lottery instant tickets, the separate (optionally detachable 302) cryptocurrency digital wallet portion 306/306' enables the consumer to readily save or transfer funds from the consumer's cold instant ticket cryptocurrency digital wallet (a.k.a., Winning Wallet) and optionally redeem the instant lottery game fiat currency portion 304/304' at a lottery retailer, assuming both fiat currency and cryptocurrency prizes were awarded on the same ticket.

The first representative example instant lottery ticket 300 and 300' instant lottery game potion 304/304' plays like a traditional instant ticket. In the example 300/300', the instant lottery game potion 304/304' is a "match three" game where six separate play scratch-off areas 301 reveal six separate variable indicium when scratched 301'. In the example ticket 300', three of the revealed variable indicia are Bitcoin indicium 305 indicating that the associated digital wallet portion 306/306' will contain cryptocurrency funds, which can be accessed after the separate digital wallet scratch-off area 303 is removed. In the example ticket 300', the digital wallet 303' shown is a cold wallet (with a magnified view of the digital wallet portion 303' illustrated in FIG. 3B and) with the associated variable indicia asymmetrical cryptographic public 310/311 and private 312/313 keys embodied as variable indicia in both machine readable QR codes 310 and 312, respectively. This greatly facilitates consumer access to the cryptocurrency prize and human readable backup of the same data provided in 311 and 313, respectively. Thus, this ticket 300/300' provides the consumer complete access to the digital or Winning Wallet via the asymmetrical cryptographic public 310/311 and private 312/313 keys thereby enabling the consumer to retain his or her cryptocurrency or readily transfer it to another digital wallet if desired.

Since the digital wallet 303' illustrated in FIGS. 3A and 3B is a cold wallet, the wallet can be funded when the instant ticket is printed, which has the advantage of simplicity and the disadvantages of possibly lower security and the overall prize fund and RTP being susceptible to cryptocurrency fluctuations. In an alternate embodiment, the digital wallet 303' illustrated in FIGS. 3A and 3B can be unfunded until the winning ticket is redeemed at a lottery retailer where the redemption process can trigger the funding of the digital wallet. This alternate embodiment has the advantages of potentially higher security and a more stable prize fund and RTP with the disadvantages of greater complexity and potential consumer confusion.

Some of the disadvantages of the first representative example instant lottery ticket 300 and 300' of FIG. 3A can be mitigated with a second representative example instant lottery ticket 300" of FIG. 3C (shown in played condition). This second representative example ticket 300" is also capable of being purchased with fiat currency and paying out a least a portion of any prizes in cryptocurrency using a cold wallet 303". The difference is the cold wallet 303" of FIG. 3C is activated in a first step by the consumer via a printed variable indicium redemption barcode (QR code in callout 307). This activation first step can also feature a prize award presentation (e.g., "You just won 0.066 Bitcoin, which is currently valued at $777.77"; an animated game such as a wheel spin that ultimate awards the predetermined amount of cryptocurrency, etc.) as well as an optional informative presentation on how to use the Winning Wallet (e.g., "Now that your digital wallet is loaded with χ Bitcoin, here is how you can use it . . . ").

This second example ticket 300" is configured the same as the first example ticket 300/300' with the instant lottery game potion being a "match three" game with six separate play scratch-off areas 301" revealing three Bitcoin variable indicum 305' indicating that the associated digital wallet portion 330" can receive cryptocurrency funds. However, in the example ticket 300", the winning digital wallet 303" illustrated is a cold wallet (with a magnified view of the digital wallet portion 303" is illustrated in FIG. 3D and) with the addition of a consumer activated redemption variable indicium portion 307/307' that immediately causes the associated digital wallet 303" to be loaded remotely with the appropriate cryptocurrency winnings when scanned or actuated. Once activated, the asymmetrical cryptographic public 308 and private 309 keys including the cold winning digital wallet can become functional. As before, the cold winning digital wallet is embodied as variable indicia, both as machine readable QR codes and human readable backup.

It should be appreciated that even though the winning digital wallet 303" illustrated in FIGS. 3C and 3D is a cold wallet, the winning digital wallet does not need to be funded when the instant ticket is printed. Since the separate consumer activation portion 307 enables the consumer to seamlessly load the cryptocurrency winnings into the winning digital wallet after purchase and game play, the ticket 300" has the advantages of presumably higher security and a comparatively stable overall prize fund and RTP. While some consumer confusion can arise from the need to first activate or load the digital wallet 303" with the activation portion 307, such confusion arising from this process can be less than the previous described embodiment where the winning digital wallet is loaded with cryptocurrency funds only after the ticket is redeemed at a lottery retailer's establishment.

FIG. 3E provides a schematic view of a third representative example of a played instant lottery ticket 315 capable of being purchased with fiat currency and paying out a least a portion of any prizes in cryptocurrency using a hot wallet 318. By employing a hot winning digital wallet 318, the activation and loading of the winning digital wallet 318 can be completely transparent to the consumer. As before, this third representative example ticket 315 is also capable of being purchased with fiat currency and paying out a least a portion of prizes in cryptocurrency with the ticket 315 configured the same as the first example ticket 300/300'. The instant lottery game portion is a "match three" game with six separate play scratch-off areas 306 revealing three Bitcoin variable indicium 317 indicating that the associated digital wallet portion 318 can receive cryptocurrency funds. However, in example 315, the illustrated winning digital wallet variable indicia 318 is a hot wallet with the consumer causing the associated winning digital wallet 318 to be loaded remotely with the appropriate cryptocurrency winnings when accessed via the Internet (either through the machine readable QR code or by manually typing in the human readable Internet address). Also, during the activation process, the hot digital wallet Internet interface can prompt the consumer to enter new authentication information (e.g., username, password) that will grant them seamless access to the asymmetrical cryptographic public 308 and private 309 keys in the future, which in a hot wallet the existence thereof may not be obvious to the consumer. Thus, this embodiment has the advantage of ergonomic simplicity with the disadvantage of potentially lower security due to a hot wallet implementation.

The present disclosure contemplates other embodiments for funding lottery instant tickets that payout out at least a portion of prizes in cryptocurrency that can be under some circumstances more desirable. For example, the present disclosure contemplates printing a cold Winning Wallet on a separate receipt when the instant ticket is redeemed at a lottery retailer with no Winning Wallet printed on the instant ticket. The present disclosure contemplates hot wallet links that take consumers to a site can also enable the consumer to create their own deterministic winning hot wallet that is subsequently automatically funded subsequent to creation. The present disclosure contemplates hot wallet links that are only active after the tickets from the book of tickets from which they came were placed on sale.

Figure 3F:
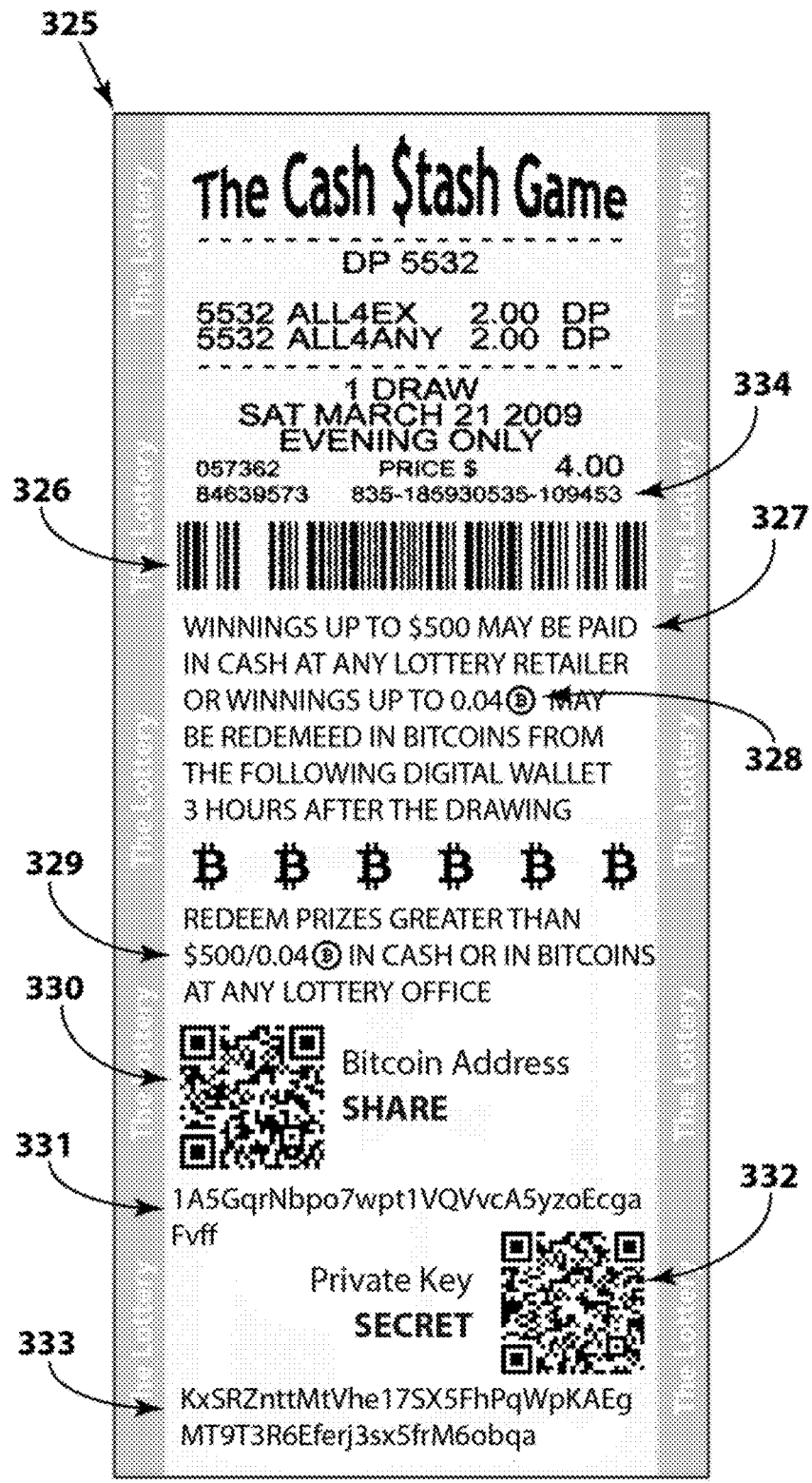
FIG. 3F is a schematic view of a representative example of a draw game ticket that was purchased with fiat currency and optionally paying prizes in cryptocurrency using a cold wallet in accordance with of one example embodiment of the present disclosure.

In addition to lottery instant ticket physical embodiments, FIG. 3F provides a schematic view of a representative example of a draw game ticket 325 that was purchased with fiat currency and optionally paying any prizes in cryptocurrency using a cold wallet. As shown in FIG. 3F, similar to the previous instant ticket embodiments, draw game representative example ticket 325 includes a traditional draw game portion with its own validation or inventory control barcode 326 as well as a cryptocurrency prize payout portion with instructions 327. The ticket 325 also includes the draw game ticket's cold Winning Wallet asymmetrical cryptographic public (variable indicia machine readable QR code embodiment 330 and human readable embodiment 331) and private (variable indicia machine readable QR code embodiment 332 and human readable embodiment 333) keys.

However, draw game ticket 325 differs from the previously disclosed instant ticket embodiments, because as its name implies, a draw game ticket is in effect a wager on a future drawing (e.g., Powerball, Mega Millions, Pick-3) with the draw game ticket printed on demand in real time. From a practical standpoint, the future drawing at a scheduled time with the wager ticket printing on demand create different paradigms for funding Winning Wallets with cryptocurrency.

For example, the redemption instructions 327 printed on exemplary ticket 325 designates a specific time period when winning digital wallets will be funded (i.e., "WINNINGS UP TO 0.04 'Bitcoins' MAY BE REDEEMED IN BITCOINS FROM THE FOLLOWING DIGITAL WALLET 3 HOURS AFTER THE DRAWING"), thus since the drawing time is known, theoretically the cryptocurrency funding system in this example can have up to three hours after the drawing to load winning digital wallets or enable winning digital wallets to be loaded on demand. In other words, in embodiments where the draw game prize was stated in advance to be payable in cryptocurrency, cold or hot Winning Wallets associated with winning tickets can be automatically funded in cryptocurrency by the time specified. However, for embodiments where the consumer or player has an option to receive winnings in fiat currency or cryptocurrency, a consumer activation event must occur where the consumer essentially commits to receive winnings in cryptocurrency before the Winning Wallet is funded. In one embodiment, this activation event commitment can be accomplished by having a lottery retailer first scan the ticket's variable indicia redemption code barcode 326 and then designate the prize to be paid out in cryptocurrency on the lottery terminal. In another embodiment, the consumer can be supplied with a lottery application or Internet web portal for their personal device (e.g., smart phone, laptop computer, tablet) that actuates the cryptocurrency activation commitment by scanning the same redemption code barcode 326 or by entering the equivalent human readable inventory data 334. In another embodiment, a link to an Internet hot wallet instead of the variable indicia cold wallet asymmetrical cryptographic public and private keys illustrated in FIG. 3F can be printed on the draw game ticket with hot wallet winnings funding occurring when the wallet was first accessed.

Aside from Winning Wallet funding, another cryptocurrency prize payout paradigm unique to draw game tickets is the ability to publish a specific amount of cryptocurrency based on the exchange rates at the time the draw game ticket was printed. For example, FIG. 3F illustrates a threshold for awarding prizes with anonymity (typical for lottery payouts) as up to "$500" or "0.04 Bitcoin" (328 and 329). The exchange rate for this conversion calculation can be garnered at the time of the draw game ticket printing. In various embodiments, the draw game ticket can also include a table of equivalent cryptocurrency values for various redeemable prize levels also calculated at the time of the draw game ticket printing. This embodiment having the potential advantage of mitigating "sticker shock" that can occur with some consumers who were unfamiliar with the fiat currency to cryptocurrency exchange rate can become irritated at the small amount of cryptocurrency that they won.

The present disclosure contemplates other embodiments for operating draw games that payout out at least a portion of prizes in cryptocurrency that can be under some circumstances more desirable. For example, some prize levels can be payable only in fiat currency (e.g., $1, Powerball grand prize winner) because of the logistical problems associated with converting these prize levels to cryptocurrency. Another example embodiment might be printing variable indicia of a cold Winning Wallet on a separate receipt when the draw game ticket is redeemed at a lottery retailer.

Figure 3G:
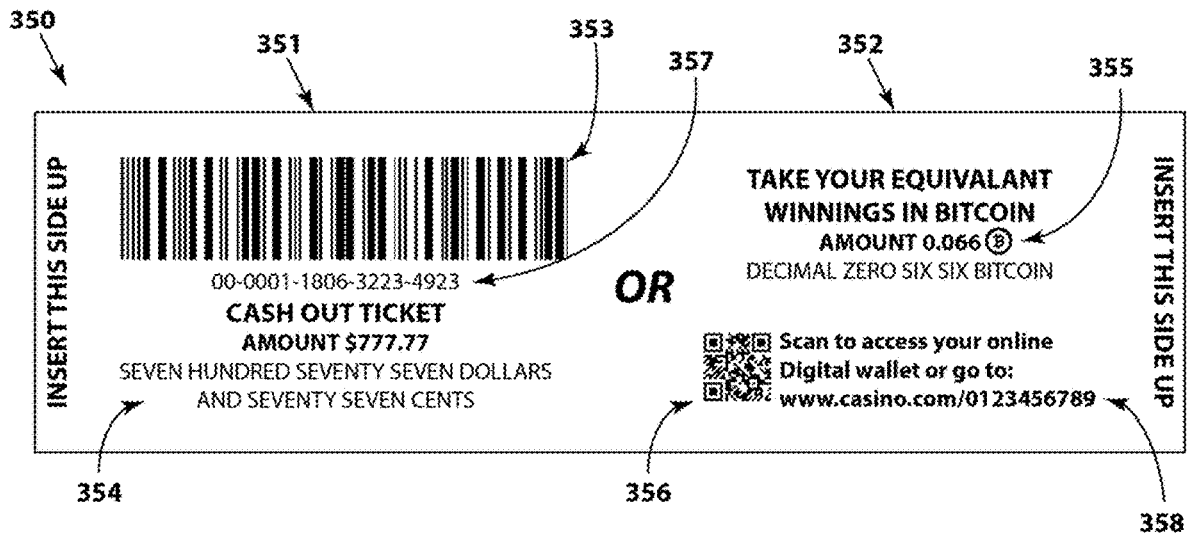
FIG. 3G is a schematic view of a representative example of a Tito ticket representing winnings that are payable in either fiat currency or in cryptocurrency using a hot wallet in accordance with of one example embodiment of the present disclosure.

In addition to lottery product physical embodiments, FIG. 3G provides a schematic view of a representative example alternative embodiment of a gaming machine Tito ticket 350 where multiple wagers were made with fiat currency that enables the player or consumer to optionally cash out their winning in either fiat currency or cryptocurrency. As shown in FIG. 3G, the Tito ticket 350 includes two portions enabling different cash out options, and specifically a fiat currency cash out portion 351 and a cryptocurrency cash out portion 352. Both portions each contain variable indicia machine readable barcodes (353 for the fiat currency portion and 356 for the cryptocurrency portion) as well as human readable text (354 for the fiat currency portion and 355 for the cryptocurrency portion) that record the unique validation or inventory control numbers (357 for the fiat currency portion and 358 for the cryptocurrency portion) that can enable manual redemption if necessary.

The two cash out options in this example are mutually exclusive in that whichever option the player or consumer enables to cash out (i.e., fiat currency or cryptocurrency), the other option can be immediately disabled. Consequently, the two cash out managing processes (i.e., fiat currency and cryptocurrency Winning Wallet) can be in constant communications with each other only garnering payment of winnings after the related process acknowledges that it has disable its payment option for this particular Tito ticket 350. In the example 350 of FIG. 3G, the Winning Wallet is illustrated as a hot wallet and therefore if the fiat currency cash out portion 351 was selected by the player or consumer, the Internet access to the hot wallet itself can be disabled in addition to withholding cryptocurrency funding to that wallet.

The present disclosure contemplates other embodiments for operating gaming machine games that payout out at least a portion of any prizes in cryptocurrency that can be under some circumstances more desirable. For example, gaming machines can be programmed to ask the player or consumer if they prefer cashing out in fiat currency or cryptocurrency and then printing a Tito ticket only with the portion (i.e., fiat currency or cryptocurrency) that was selected.

Figure 3H:
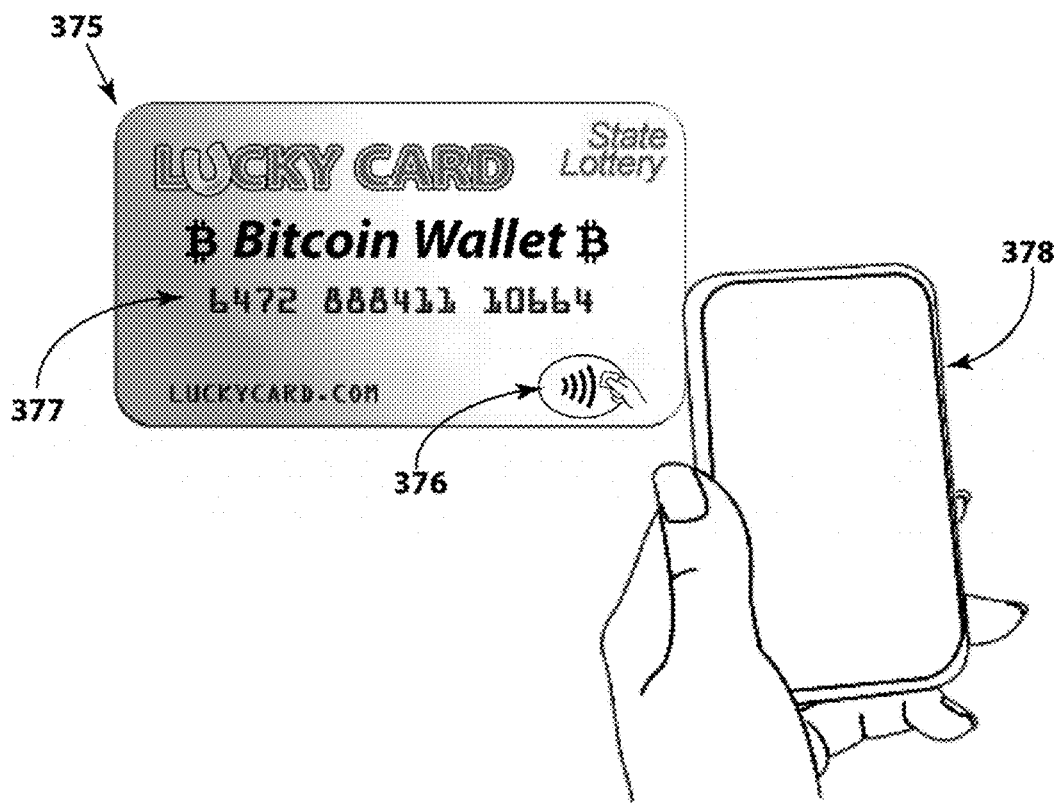
FIG. 3H is a schematic view of representative examples of a loyalty card and/or hotel key capable of maintaining a cold digital wallet for cryptocurrency winnings in accordance with of one example embodiment of the present disclosure.

This is not to imply that all physical embodiments of Winning Wallets are printed on paper or some other substrate. For example, FIG. 3H illustrates an alternative embodiment of a plastic lottery loyalty card 375 with an unique redemption code 377 that identifies each card to a particular player or consumer independent of Winning Wallet data—e.g., asymmetrical cryptographic public and private keys. With this alternative embodiment, the plastic lottery loyalty card 375 also functions as a highly secure cold Winning Wallet for managing lottery cryptocurrency winnings. Essentially, the cold Winning Wallet includes a secure embedded microprocessor with a Near Field Communications (NFC) antenna 376 implanted in the plastic card—e.g., ISO/IEC 7810 ID-1 standard plastic card with a static tamper-resistant microprocessor compliant with an ISO/IEC 14443 contactless communications interface. With this alternative embodiment, the embedded secure microprocessor can communicate with any player or consumer ISO/IEC 14443 NFC capable device (e.g., smart phone 378) to communicate at least the Winning Wallet's asymmetrical cryptographic public and/or private keys via NFC 376 to the player's or consumer's device after at least one form of authentication (e.g., user password, device Media Access Control or "Mac" address). The Winning Wallet's data (e.g., cryptographic keys) can be loaded by lottery personnel using an authorized NFC device (typically for high tier winners) or, alternatively, by the player or consumer using their own NFC device—e.g., by scanning the QR codes of a Winning Wallet off of a winning lottery ticket using their personal device and thereby submitting the Winning Wallet's data to the card's microprocessor's memory.

This alternative loyalty card 375 has the advantages of providing a highly secure, rugged form of a cold Winning Wallet and a user friendly interface with the disadvantage of higher costs. Additionally, while this alternative relates to a loyalty card 375 of FIG. 3H, this should be construed as only for exemplary purposes since there are numerous other potential embodiments for a secure NFC microprocessor based cold wallet such as but not limited to a casino loyalty card, hotel room key, gift card, etc.

Figure 3I:
FIG. 3I is a schematic view of representative examples of a gift card capable of maintaining a cold digital wallet for cryptocurrency in accordance with of one example embodiment of the present disclosure.

Alternatively, the example gift cards 380 and 380' of FIG. 3I illustrate another alternative embodiment of an open loop gift card where the consumer purchases the gift card for a variable amount of fiat currency 382 with the appropriate funds of cryptocurrency subsequently deposited in the gift card's "Secret Cache" digital wallet. Callout 380 illustrates the exemplary gift card in a purchased and played (scratched) condition after being sold to a consumer with callout 380' showing the same gift card's back.

As shown in FIG. 3I, the exemplary gift card 380/380' is printed as a scratch-off hanging card suitable for display in gift card kiosks with the "Secret Cache" digital wallet 381 optionally separable by a perforation 384. The representative gift card 380 and 380' has its "Secret Cache" printed variable indicia digital wallet 381 concealed by a scratch-off coating when it is unsold. This scratch-off concealment mechanism is principally for esthetics but is nevertheless secure even if the unsold gift card is placed within easy reach of consumers because the "Secret Cache" digital wallet 381 is not funded until after the gift card is purchased. When purchased, the retailer scans the activation redemption code barcode 385, for example, located on the back of the gift card, which notifies a central site that this particular gift card has been purchased and optionally for how much fiat currency was paid to purchase the gift card. At this point, the central site transfers the appropriate cryptocurrency funds from its Funding Wallet 244 (FIG. 2F) to the "Secret Cache" digital wallet 381 completing the activation. Optionally, as an additional security measure making it more obvious if an unsold card was tampered with, a second scratch-off area 383 can conceal a secondary validation code variable indicia that the retailer can physically key in to complete the activation.

Figure 3J:
FIG. 3J is an enlarged view of the representative example callout 381' portion of FIG. 3I.

In the example ticket 300, the "Secret Cache" digital wallet 381 is shown as a cold wallet (magnified view of the digital wallet portion 381' is illustrated in FIG. 3J) with the associated asymmetrical cryptographic public 386 and private 387 keys embodied both as machine readable QR codes and as human readable backup. Thus, in the gift card 380/380', the consumer is provided complete access to the "Secret Cache" digital wallet 381 via the asymmetrical cryptographic public 386 and private 387 keys, thereby enabling the consumer to retain their cryptocurrency or readily transfer it to another digital wallet if desired.

The present disclosure contemplates other embodiments for offering gift cards that are purchased with fiat currency and are redeemed in cryptocurrency that can be under some circumstances more desirable. For example, hot wallet gift cards with an Internet link instead of the cold wallet shown in FIGS. 3I and 3J, or a cold digital wallet gift card embodied in a plastic card with an embedded NFC enabled microprocessor (e.g., FIG. 3H), etc.

Figure 3K:
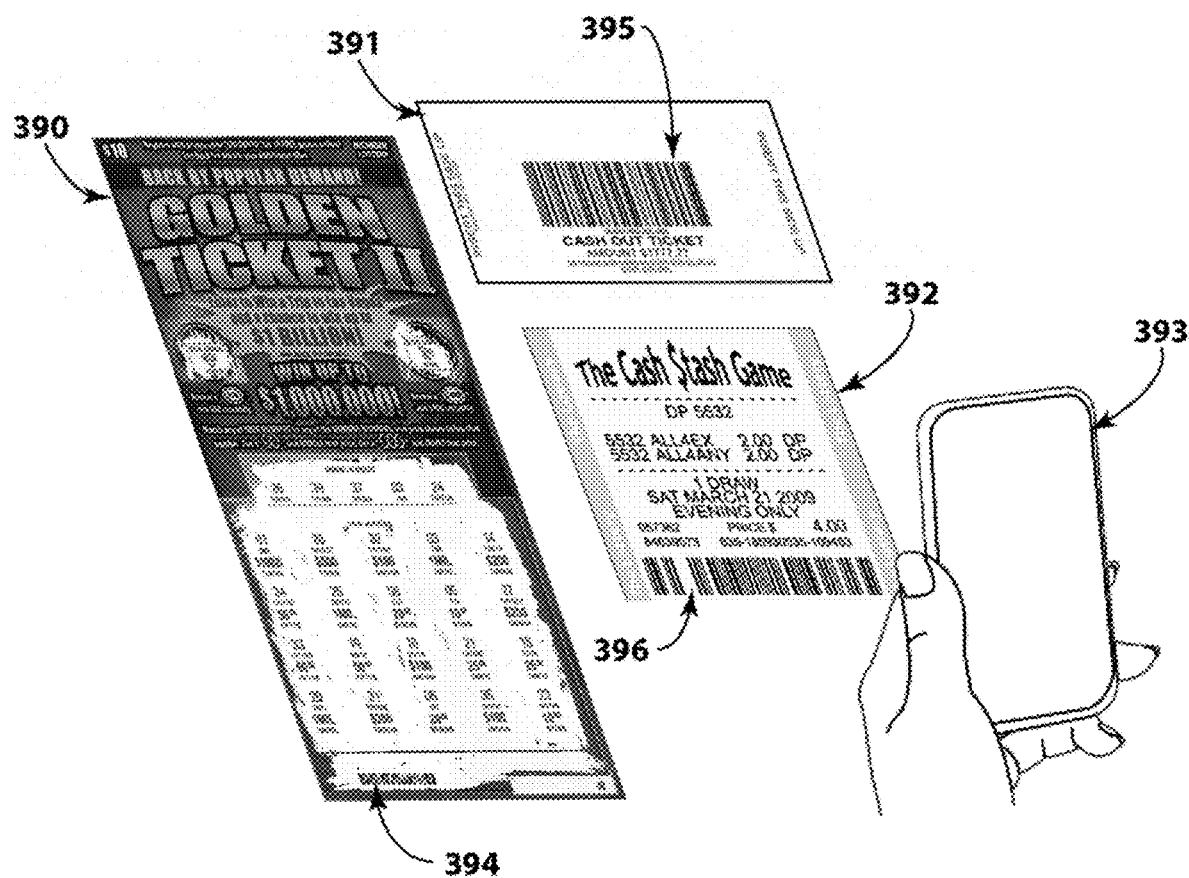
FIG. 3K is an isometric view of representative examples showing part of a method for redeeming gaming tickets as cryptocurrency in a hot digital wallet maintained by an application in accordance with of one example embodiment of the present disclosure.

FIG. 3K provides a schematic view of a representative example of a consumer or player electing to accept winnings from prior art lottery instant tickets 390, Tito tickets 391, and lottery draw game tickets 392 in cryptocurrency by utilizing an application on their smart phone 393 or other device with a downloaded application in accordance with the present disclosure to scan the redemption codes (394 thru 396) printed on the tickets. Thus, with this embodiment, the consumer or player can elect to cash out winnings in cryptocurrency simply by downloading an application and using the application to scan the winning ticket's redemption code (394 thru 396). When scanned, the redemption code is passed to a central site in a manner similar to a lottery or casino terminal or kiosk with the central site verifying that the scanned redemption code is in fact a winner and has not been previously paid. Assuming the redemption code is valid, the central site can record in its database that the particular redemption code is paid and transfer the appropriate amount of cryptocurrency to the consumer's or player's wallet. In this embodiment, at least the public key portion of the consumer's or player's wallet can be embedded into the downloaded application. Thus, depending on the implementation and/or the consumer's or player's preference, the wallet can be either hot or cold.

The present disclosure contemplates that the disclosed methods, systems, and devices are also applicable to Non-Fungible Tokens (NFTs). For example, NFTs can be transferable via public and private codes concealed under a SOC on lottery instant tickets.

It should be appreciated by those skilled in the art in view of this description that various modifications and variations may be made present invention without departing from the scope and spirit of the present invention. It is intended that the present invention include such modifications and variations as come within the scope of the appended claims.

What is claimed is:

1. A plurality of instant lottery tickets comprising:
 a first instant lottery ticket comprising:
   a first substrate;
   a first inventory control number printed on the first substrate;
   a first digital wallet portion printed on the first substrate, the first digital wallet portion associated with a first amount of cryptocurrency, the first digital wallet portion comprising:
     (a) first machine-readable indicia, and
     (b) first redundant human-readable text indicia;
   a first machine-readable activation code printed on the first substrate;
   a first game portion printed on the first substrate and that indicates a first monetary value of the first digital wallet portion, the first monetary value being greater than zero; and
   a first scratch-off coating covering the first digital wallet portion, the first machine-readable activation code, and the first game portion; and
 a second instant lottery ticket comprising:
   a second substrate;
   a second inventory control number printed on the second substrate;
   a second digital wallet portion printed on the second substrate, the second digital wallet portion associated with a second amount of cryptocurrency, the second digital wallet portion comprising:
     (a) second machine-readable indicia, and
     (b) second redundant human-readable text indicia;
   a second machine-readable activation code printed on the second substrate;
   a second game portion printed on the second substrate and that indicates a second monetary value of the second digital wallet portion, the second monetary value being zero; and
   a second scratch-off coating covering the second digital wallet portion, the second machine-readable activation code, and the second game portion.

2. The plurality of instant lottery tickets of claim 1, wherein the first digital wallet portion is a first cold digital wallet.

3. The plurality of instant lottery tickets of claim 2, wherein the first cold digital wallet comprises printed first indicia data that comprises a first asymmetrical cryptographic public and private key pair.

4. The plurality of instant lottery tickets of claim 3, wherein the first printed indicia data that comprises the first asymmetrical cryptographic public and private key pair comprises first machine-readable indicia embodied as a first Quick Response (QR) code.

5. The plurality of instant lottery tickets of claim 1, wherein the first digital wallet portion is a first hot wallet with the first machine-readable indicia providing a first Internet address and first passcode to the first online wallet.

6. The plurality of instant lottery tickets of claim 5, wherein the first hot wallet is a first deterministic wallet.

7. The plurality of instant lottery tickets of claim 1, which comprises a separate activation code printed on the first substrate to enable the first digital wallet portion.

8. The plurality of instant lottery tickets of claim 7, wherein the separate activation code is embodied as a first Quick Response (QR) code.

9. A plurality of instant lottery tickets comprising:
   a first instant lottery ticket comprising:
      a first substrate;
      a first inventory control number printed on the first substrate;
      a first digital wallet portion printed on the first substrate, the first digital wallet portion associated with a first amount of cryptocurrency, the first digital wallet portion comprising:
         (a) first machine-readable indicia, and
         (b) first redundant human-readable text indicia;
      a first human-readable activation code printed on the first substrate;
      a first game portion printed on the first substrate and that indicates a first monetary value of the first digital wallet portion, the first monetary value being greater than zero; and
      a first scratch-off coating covering the first digital wallet portion, the first human-readable activation code, and the first game portion; and
   a second instant lottery ticket comprising:
      a second substrate;
      a second inventory control number printed on the second substrate;
      a second digital wallet portion printed on the second substrate, the second digital wallet portion associated with a second amount of cryptocurrency, the second digital wallet portion comprising:
         (a) second machine-readable indicia, and
         (b) second redundant human-readable text indicia;
      a second human-readable activation code printed on the second substrate;
      a second game portion printed on the second substrate and that indicates a second monetary value of the second digital wallet portion, the second monetary value being zero; and
      a second scratch-off coating covering the second digital wallet portion, the second human-readable activation code, and the second game portion.

10. The plurality of instant lottery tickets of claim 9, wherein the first digital wallet portion is a first cold digital wallet.

11. The plurality of instant lottery tickets of claim 10, wherein the first cold digital wallet comprises printed first indicia data that comprises a first asymmetrical cryptographic public and private key pair.

12. The plurality of instant lottery tickets of claim 11, wherein the first printed indicia data that comprises the first asymmetrical cryptographic public and private key pair comprises first machine-readable indicia embodied as a first Quick Response (QR) code.

13. The plurality of instant lottery tickets of claim 9, wherein the first digital wallet portion is a first hot wallet with the first machine-readable indicia providing a first Internet address and first passcode to the first online wallet.

14. The plurality of instant lottery tickets of claim 13, wherein the first hot wallet is a first deterministic wallet.

15. The plurality of instant lottery tickets of claim 9, which comprises a separate activation code printed on the first substrate to enable the first digital wallet portion.

16. The plurality of instant lottery tickets of claim 15, wherein the separate activation code is embodied as a first Quick Response (QR) code.

\* \* \* \* \*